United States Patent
Vacura et al.

(10) Patent No.: US 11,720,314 B1
(45) Date of Patent: Aug. 8, 2023

(54) ELECTRONIC DEVICES AND CORRESPONDING METHODS FOR ALTERING CONTENT TO MEET INPUT PARAMETERS OF A COMPANION DEVICE

(71) Applicant: Motorola Mobility LLC, Chicago, IL (US)

(72) Inventors: Daniel M Vacura, Chicago, IL (US); Bill Ryan, Libertyville, IL (US); Amit Kumar Agrawal, Bangalore (IN); Jeffrey S Vanhoof, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/709,878

(22) Filed: Mar. 31, 2022

(51) Int. Cl.
*G06F 3/14* (2006.01)
*G09G 5/00* (2006.01)
*G09G 5/14* (2006.01)

(52) U.S. Cl.
CPC .......... *G06F 3/1454* (2013.01); *G09G 5/006* (2013.01); *G09G 5/14* (2013.01); *G09G 2340/0492* (2013.01); *G09G 2360/04* (2013.01); *G09G 2360/06* (2013.01); *G09G 2370/06* (2013.01); *G09G 2370/16* (2013.01)

(58) Field of Classification Search
CPC ........ G06F 3/1454; G09G 5/006; G09G 5/14; G09G 2340/0492; G09G 2360/04; G09G 2360/06; G09G 2370/06; G09G 2370/16
See application file for complete search history.

(56) References Cited

U.S. PATENT DOCUMENTS

| | | | |
|---|---|---|---|
| 2012/0050331 A1* | 3/2012 | Kanda | H04N 21/440263 345/649 |
| 2014/0358981 A1* | 12/2014 | Miyake | G06F 3/1454 709/201 |
| 2015/0193187 A1* | 7/2015 | Kimn | G09G 5/006 345/1.2 |
| 2019/0333479 A1* | 10/2019 | Maalouf | G09G 5/14 |
| 2020/0344278 A1 | 10/2020 | Mackell | |
| 2022/0391158 A1 | 12/2022 | Lemmens | |

OTHER PUBLICATIONS

"How-To: Turn your Android phone into the best webcam for Zoom, Skype, Meet and Teams for free", Published Mar. 21, 2021 online at https://www.gsmarena.com/best_way_to_use_your_android_phone_as_a_webcam_we_test_the_apps_and_compare_the_results-news-47897.php.

(Continued)

*Primary Examiner* — Brent D Castiaux
(74) *Attorney, Agent, or Firm* — Philip H. Burrus, IV

(57) ABSTRACT

An electronic device includes a display presenting content. A communication device is electronically in communication with a content presentation companion device operating as a primary display for the electronic device. The communication device receives signals indicating a geometric orientation of the content presentation companion device in three-dimensional space. One or more processors alter the content being presented on the display to obtain altered content configured in accordance with one or more content input parameters required for content presentation on the content presentation companion and defined by the geometric orientation of the content presentation companion device in the three-dimensional space.

20 Claims, 10 Drawing Sheets

(56) References Cited

OTHER PUBLICATIONS

Michaels, Philip, "Motorola 'Ready For' transforms this Android into a mini PC"; Tom's Guide; Published Mar. 19, 2021 online at https://www.tomsguide.com/news/motorola-ready-for-transforms-this-android-phone-into-a-mini-pc.

"Motorola—Ready For", Available prior to filing of present application; Viewed online at https://www.motorola.com/we/ready-for.

Mello, Elaine M, "Using your Android phone as a web camera on the Mac Using USB", Published May 2020 online at https://open.mit.edu/c/teachremote/2gu/using-your-android-phone-as-a-web-camera-on-the.

Russell, Brandon, "Galazy S21 features wireless support for Samsung DeX on PC", Published Feb. 5, 2021 online at https://www.xda-developers.com/galaxy-s21-wireless-support-samsung-dex-on-pc/.

El-Zoobi, Maria, "NonFinal Office Action", U.S. Appl. No. 17/709,858, filed Mar. 31, 2022; dated Apr. 5, 2023.

* cited by examiner

ELECTRONIC DEVICES AND CORRESPONDING METHODS FOR ALTERING CONTENT TO MEET INPUT PARAMETERS OF A COMPANION DEVICE

BACKGROUND

Technical Field

This disclosure relates generally to electronic devices, and more particularly to electronic devices operable with companion electronic devices.

Background Art

The technology associated with portable electronic devices, such as smartphones and tablet computers, is continually improving. Illustrating by example, while not too long ago such devices included only grey scale liquid crystal diode displays with large, blocky pixels, modern smartphones, tablet computers, and even smart watches include vivid organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, some portable electronic devices include a content redirection feature. Using the content redirection feature, content may stream through a portable electronic device such as a smartphone, but then be redirected to a larger display. While great for watching content, the user interface settings associated with the larger display are generally static. Making adjustments can require multiple steps and can be tedious and time consuming. It would be advantageous to have an improved electronic device with enhanced user interface features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
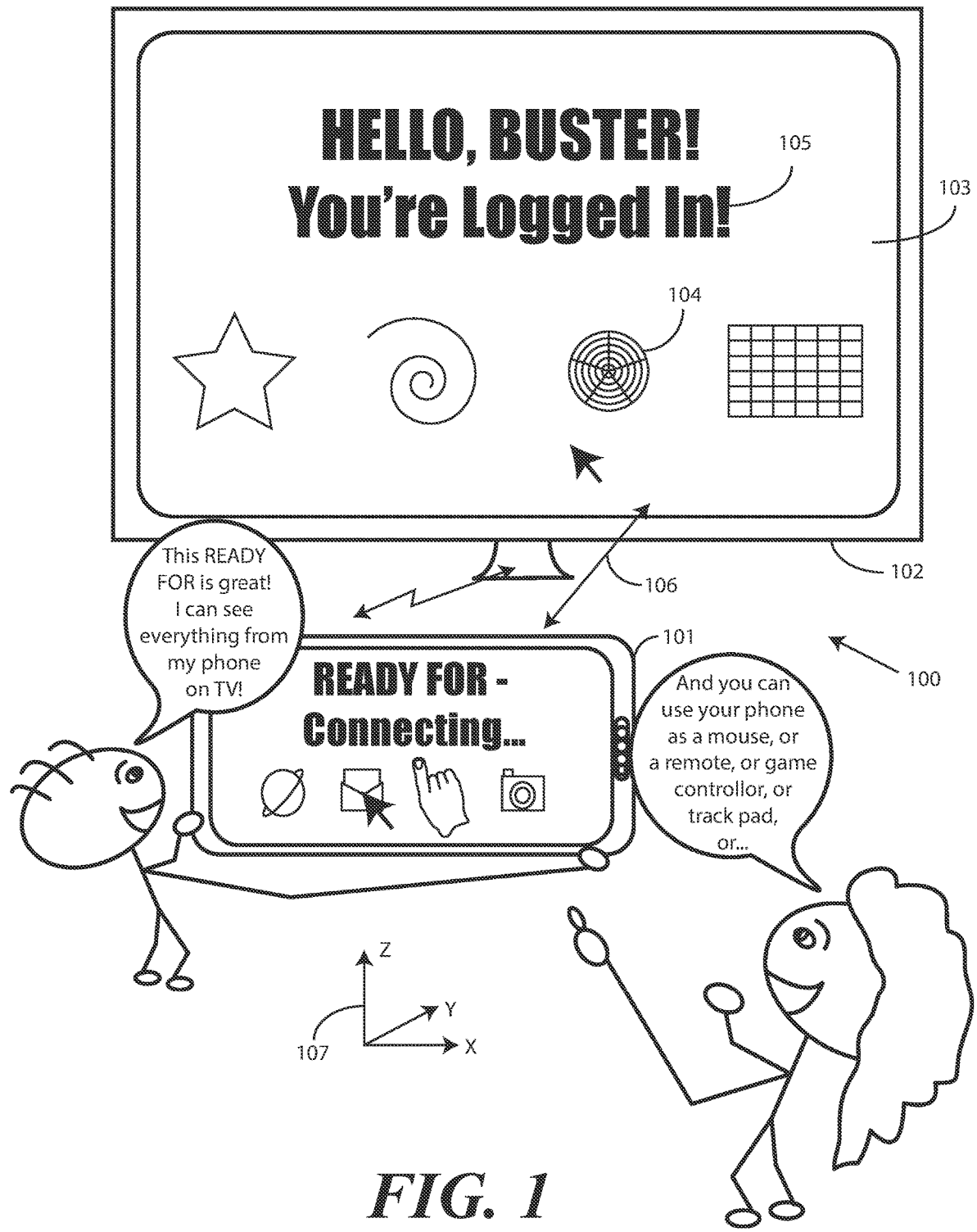
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to dynamically enhancing a user interface of a content presentation companion device by altering content being presented on the display of the content presentation companion device to meet one or more content input parameters required by the content presentation companion device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of dynamically enhancing a user interface of a content presentation companion device by altering the content being presented on the display to obtain altered content configured in accordance with one or more content input parameters required for content presentation on the content presentation companion device as described herein. In one or more embodiments, the one or more content input parameters are defined by the geometric orientation of the content presentation companion device in the three-dimensional space.

The non-processor circuits may include, but are not limited to, a radio receiver, a radio transmitter, signal drivers, clock circuits, power source circuits, and user input devices. As such, these functions may be interpreted as steps of a method to perform the altering of the content being presented on a display of the electronic device as a function of the geometric orientation of the content presentation companion device in the three-dimensional space to obtain altered content.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, some modern portable electronic devices are equipped with a content redirection feature. Using smartphones manufactured by Motorola Mobility. sup. TM as one illustrative example, some models are equipped with their Ready For.sup.TM, which is a feature that allows the Ready For.sup.TM device to connect to a content presentation companion device such as a larger monitor, television, or other device having a larger screen. Using the Ready For.sup.TM feature, users can wirelessly stream video content to the larger display of a content presentation companion device with no loss in performance.

Resolution of the images on the content presentation companion device is up to 4K with a frame rate that presents content without flicker or distortion. Moreover, neither a cable nor a docking station is required to use the Ready For.sup.TM feature. When using the feature, the smartphone can be used as a mouse, trackpad, or other control device while content is being presented on the content presentation companion device. Alternatively, display of the smartphone can mirror the content that is being presented on the content presentation companion device. The Ready For.sup.TM feature can be used for presenting pictures, videos, television shows, or movies on the larger display of a content presentation companion device. Additionally, it can be used for gaming, videoconferences, and other content presentation tasks.

The content redirection feature is especially useful in the context of videoconferences. This is true for at least two reasons: first, modern smartphones are equipped with some of the best digital cameras in the consumer market. Newer devices generally offer the use of the latest imaging sensor and lens component technology to capture images or video that reveal fine details with excellent colors, even in low light environments. Many smartphones are even equipped with multiple cameras that allow the collective system to focus on a single subject—even in extreme zoom configurations—without losing any details. These systems also allow a user to greatly expand the field of view to capture more of a scene.

In addition to these high-quality image capture devices, most smartphones are also equipped with advanced graphics processors, dedicated artificial intelligence (AI) engines, and additional hardware sensors capable of detecting orientation and movement. With all this power, users of such devices increasingly rely upon the same for most of their photograph and video capture needs.

At the same time, most smartphones have a relatively small display. When using a content presentation companion device such as a widescreen television, moving the images associated with the videoconference to such a wide screen makes it feel like the participants are right in the room with you. Combining a modern smartphone being used as a "webcam" with a content presentation companion device being used as a monitor allows a participant to look great in any light while ensuring that the other videoconference participants can be clearly seen in large images presented in vivid color.

Moreover, using such a system allows a participant to free their hands and focus on creating content. Using such a hybrid system the participant need not worry of moving "out of the frame" due to the software built into the smartphone that tracks face movement to ensure the participant is always "front and center" in their videoconference video feed.

Yet another advantage offered by the hybrid system is the ability for a participant to see what they look like on the large content presentation companion device display "in the moment," i.e., in real time. The hybrid system eliminates the need for "retakes" when experiencing a minor wardrobe malfunction or when a stray hair is out of place. The use of the larger monitor provided by the content presentation companion device also allows the participant to keep notes or talking points within their line of sight so they can appear professional when delivering presentation.

While such content redirection features work well in practice, both in videoconference applications and other applications, prior art systems are not well suited for operation with modern content presentation companion devices that facilitate multiple orientations. Illustrating by example, some modern monitors come equipped with fancy stands that allow a user to not only adjust the height of the monitor but to selectively pivot the monitor between a portrait orientation and a landscape orientation. This creates a problem in that prior art devices are unable to detect that the device is even connected to a content presentation companion device, much less its orientation in three-dimensional space. Thus, when the content presentation companion device is oriented in the portrait orientation with the electronic device using the content presentation companion device as a primary display oriented in the landscape orientation, applications running on that electronic device are literally incapable of determining (1) that a content presentation companion device is being used and (2) the orientation of the content presentation companion device in three-dimensional space.

Embodiments of the disclosure provide a solution to this problem, and one that encourages the use of an electronic device such as smartphone with a complementary auxiliary display for videoconferencing and other applications. Embodiments of the disclosure accomplish this by equipping the smartphone with the capabilities to provide content to the content presentation companion device in a format matching not only the orientation of the content presentation companion device in three-dimensional space, but in accordance with any other content input parameter that may be required to optimally present the content on the content presentation companion device, examples of which include aspect ratio, frame rate, image size, and so forth.

If the content presentation companion device is in a landscape orientation, one or more processors of the smartphone provide content in a landscape image orientation—regardless of whether the smartphone itself is physically oriented in a portrait or landscape orientation. Similarly, if the content presentation companion device is pivoted to a portrait orientation, the one or more processors of the electronic device then deliver content with a portrait image orientation to the content presentation companion device. Again, this happens regardless of whether the smartphone is physically oriented in the portrait or landscape orientation.

In one or more embodiments, one or more processors of an electronic device detect a communication device electronically in communication with an auxiliary display, referred to herein as a "content presentation companion device." In one or more embodiments the content presentation companion device is operating as a primary, secondary, or auxiliary display for the electronic device while one or more processors of the electronic device deliver content from one or more applications operating on the electronic device to the content presentation companion device.

In one or more embodiments, the one or more processors determine from signals received from the content presentation companion device by the communication device, whether the content presentation companion device is physically oriented in a portrait orientation in three-dimensional space or a landscape orientation in three-dimensional space. In one or more embodiments, this determination is made directly by delivering signals interrogating one or more sensors of the content presentation companion device.

Regardless of whether the electronic device is in the portrait orientation or the landscape orientation, one or more processors of the electronic device generate video output to match the orientation of the content presentation companion device. Effectively, the electronic device delivers an output video feed based upon the geometric orientation of the content presentation companion device in three-dimensional space. If, for example, the electronic device is in the landscape orientation and the content presentation companion device is in the portrait orientation, the video feed delivered from the electronic device to the content presentation companion device will be in the portrait orientation.

This occurs despite the fact that the same video feed may be being concurrently presented in a different orientation on a display of the electronic device. The net result is that a natural preview occurs regardless of whether a person is looking at the display of the electronic device or the display of the content presentation companion device, and regardless of whether these two displays are oriented differently in three-dimensional space.

In addition to changing portrait image orientation to landscape image orientation or vice versa, the one or more processors of the electronic device can change other parameters of content being delivered to the content presentation companion device as well. Examples of such parameters include a particular aspect ratio, a particular frame rate, and so forth. Other such parameters will be described below. Still others will be obvious to those of ordinary skill in the art having the benefit of this disclosure.

In one or more embodiments, the one or more processors of the electronic device delivering content to the content presentation companion device alter the content to create altered content meeting one or more content input parameters required for the presentation on the content presentation companion device. Thereafter, the one or more processors cause the communication device to transmit the altered content to the content presentation companion device for presentation thereon.

In one or more embodiments, one or more sensors of the electronic device initially determine whether the electronic device is in a docked or substantially stationary position. Embodiments of the disclosure contemplate that the modification of the content being delivered to the content presentation companion device may only be desirable for instances where the electronic device is being used in tandem with a content presentation companion device, where the content presentation companion device provides a display function presenting content from one or more applications operating on the electronic device. Embodiments of the disclosure contemplate that when this is occurring, the electronic device will frequently be docked or stationary. Accordingly, in one or more embodiments the altering of the content to match the physical orientation or other parameters of the content presentation companion device occurs only when the electronic device is substantially stationary or docked.

In one or more embodiments, one or more processors of the electronic device then determine that the electronic device is in communication with a content presentation companion device that is acting as a primary display for the electronic device. Optionally, using gravity sensors, orientation detectors, or other sensors, the one or more processors determine a geometric orientation of the electronic device in three-dimensional space and/or a geometric form factor of the electronic device to determine one or more content output parameters associated with the content being generated at the electronic device. If, for example, the orientation of the electronic device is a landscape orientation while one or more applications are operating on one or more processors of the electronic device, but when a content presentation companion device operating with the electronic device is in a portrait orientation, the one or more processors would need to alter the content to create content in a portrait image orientation prior to delivering the same to the content presentation companion device. This altering would occur while presenting content in a landscape image orientation on a display of the electronic device.

Since the electronic device is functioning with the content presentation companion device in tandem, in one or more embodiments the one or more processors of the electronic device can determine directly if the content presentation companion device is in the portrait orientation or the landscape orientation. This information can be used to determine other content input parameters required by the content presentation companion device, such as whether the aspect ratio is 16:9 or 9:16. If, for example, an application operating on the electronic device while in the landscape orientation is generating content with a 4:3 aspect ratio while the content presentation companion device is in a portrait orientation with a 9:16 orientation, the one or more processors would need to alter the content to change the aspect ratio prior to delivery to the electronic device.

In one or more embodiments, to match the required image orientation without distorting the content, this alteration requires changing an arrangement of the content. Illustrating by example, if a user interface in a videoconference application includes a video feed region depicting the participants and a user interface region where the application can be controlled, the one or more processors of the electronic device may position the user interface region under the depictions of the participants when delivering content in the portrait image orientation, while placing the user interface region to the side of the depictions of the participant when delivering content in the landscape image orientation, and so forth.

In one or more embodiments, in response to a determination that the electronic device is, for example, docked in a portrait orientation, the one or more processors may cause the communication device to provide content from an application operating on one or more processors of the electronic device to the content presentation companion device in a landscape mode by determining a field of view (FOV) of images being captured by the electronic device that accommodates the one or more content input parameters required by the content presentation companion device. This determination of the field of view may require the rearrangement of components of a user interface of the application so that the resulting image orientation matches the geometric orientation of the content presentation companion device in three-dimensional space. In one or more embodiments, the rearrangement can include cropping one or more videoconference feeds in a videoconference application by applying a crop filter to those videoconference feeds. In one or more embodiments, the position of the cropping filter is a function of a region of interest (ROI) identified by the one or more processors and/or generated artificial intelligence driven subject tracking.

In one or more embodiments, the region of interest is determined using artificial intelligence based subject tracking that includes the following steps: first, an aspect ratio of the image capture device of the electronic device when mounted in a portrait orientation is determined. This aspect ratio might be 9:16 or 3:4, for example.

Next, the artificial intelligence based subject tracking utilizes a subject tracking procedure to identify depictions of a subject in the one or more images being captured by the image capture device of the electronic device to determine centralized locations within the cropping mask. In one or more embodiments, artificial intelligence based subject tracking system determines a region of interest within the one or more images, with the crop mask positioned such that region of interest is situated within the one or more cropped images. In one or more embodiments, the region of interest depicts a subject of the one or more cropped images.

Next, the one or more processors determine the aspect ratio of the content presentation companion device. If, for example, the content presentation companion device is oriented in a landscape mode, this might be 16:9 or 4:3. The one or more processors then apply the cropping mask to the one or more images being captured by the image capture device of the electronic device such that a resulting application user interface including the one or more images fits within the confines of the requirements of the content presentation companion device as a function of its orientation in three-dimensional space. Thus, despite the one or more images being captured with an aspect ratio of 9:16 or 3:4, in one or more embodiments the application of the cropping mask alters the one or more images to create one or more altered images having a different aspect ratio, e.g., 16:9 or 4:3, so that they allow the composite user interface of the videoconference application to properly fit within the bounds of the display of the content presentation companion device as it sits in three-dimensional space.

The artificial intelligence based subject tracking system can track the subject based upon any number of factors. In one or more embodiments, these factors include the distance between the image capture device and the subject. The artificial intelligence based subject tracking system can determine if the subject is one of human, animal or a non-living being. If the artificial intelligence based subject tracking system determines that the subject is a human, it may utilize facial geometry of the subject as one of round vs elongated to determine whether the subject is oriented in a portrait image orientation or a landscape image orientation. If the subject is an animal, the artificial intelligence based subject tracking may use the body structure of the animal, be it a dog, cat, or bird, in the same manner.

Advantageously, embodiments of the disclosure allow a user interface from an application operating on one or more processors of an electronic device to be delivered to a content presentation companion device in accordance with one or more content input parameters defined by the physical construct of the content presentation companion device and its orientation in three-dimensional space. Embodiments of the disclosure advantageously allow electronic devices having a variety of different geometric form factors and/or positions in three-dimensional space to provide perfectly compensated content and user interfaces from applications to a content presentation companion device, even when those applications are unaware that the content presentation companion device is being used.

In one or more embodiments, an electronic device provides content generated by an application operating on the electronic device in a portrait image orientation to a content presentation companion device in a landscape image orientation by determining that the content presentation companion device is oriented in the landscape orientation in three-dimensional space. In one or more embodiments, this occurs in response to a determination that the electronic device is docked and in the portrait orientation while in communication with a content presentation companion device being used as a display. In effect, embodiments of the disclosure determine what the orientation of the content presentation companion device is and reorient (as necessary) content generated in the electronic device to match the one or more content input parameters defined by the physical structure and geometric orientation of the content presentation companion device.

Accordingly, in one or more embodiments one or more processors of an electronic device detect a communication device of the electronic device electronically in communication with a content presentation companion device operating as a primary display for the electronic device. The content presentation companion device could be anything with a display. The one or more processors determine, from signals received from the other electronic device, one or more content input parameters required by the electronic device that differ from at least one content output parameter of the image capture device. Where at least one differs, the one or more processors alter the content being presented on a display of the electronic device to create altered content meeting the one or more content input parameters required for the content to be presented on the content presentation companion device.

In one or more embodiments, a method in an electronic device comprises detecting, with one or more sensors, whether the electronic device is in a stationary condition or a docked condition. The method then includes detecting, with a communication device, a content presentation companion device in communication with the communication device and is being used as a primary display for the electronic device.

In one or more embodiments, the one or more processors detect a geometric orientation of the content presentation companion device in three-dimensional space. In one or more embodiments, the method comprises altering, with one or more processors, content being presented on a display of the electronic device as a function of the geometric orientation of the content presentation companion device in the three-dimensional space to obtain altered content, and delivering, with the communication device, the altered content to the content presentation companion device for presentation on the content presentation companion device.

Advantageously, embodiments of the disclosure provide a more intelligent system that dynamically enhances a user interface of a content presentation companion device as a function of the geometric orientation of the content presentation companion device in three-dimensional space. For instance, in one or more embodiments a user interface feature being presented on a content presentation companion device can be adjusted as the function of the geometric orientation of the content presentation companion device in three-dimensional space. Other user interface enhancements will be described below. Still others will be obvious to those of ordinary skill in the art having the benefit of this disclosure.

In one or more embodiments, various user interface presentation characteristics can change as a function of the geometric orientation of the content presentation companion device in three-dimensional space. If, for example, the content presentation companion device is rotated from a landscape orientation to a portrait orientation, the one or more processors of the electronic device can change content being delivered to the content presentation companion device from a portrait image orientation to a landscape image orientation. Effectively, embodiments of the disclosure enhance the user interface dynamically based on determining the exact geometric orientation of the content presentation companion device in three-dimensional space.

Turning now to FIG. 1, illustrated therein is one explanatory system 100 configured in accordance with one or more embodiments of the disclosure illustrating an electronic device 101 operating in conjunction with a content presentation companion device 102 in accordance with one or more embodiments of the disclosure. In FIG. 1, the electronic device 101 and the content presentation companion device 102 operate in tandem as a system, with the electronic device 101 providing the processing power while the content presentation companion device 102 serves as a primary display device for the electronic device 101.

As shown in FIG. 1, the electronic device 101 is electronically in communication with the content presentation companion device 102. When the electronic device 101 is electronically in communication with the content presentation companion device 102, this allows the electronic device 101 to use the larger display 103 of the content presentation companion device 300 to present content. Illustrating by example, in one or more embodiments the electronic device 101 can operate in a "content redirection" mode by presenting content such as movies, videos, images, and even a traditional computer user interface, on the display 103 of the content presentation companion device 102.

The electronic communication between the electronic device 101 and the content presentation companion device 102 also allows the electronic device 101 to directly query electrical components situated within the content presentation companion device 102 such as sensors that are configured to detect a geometric orientation of the content presentation companion device 102 in three-dimensional space 107. In the illustrative embodiment of FIG. 1, both the electronic device 101 and the content presentation companion device 102 are oriented in the landscape orientation in the three-dimensional space 107.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, engaging in videoconferences, and so forth. By establishing an electronic communication channel between the electronic device 101 and the content presentation companion device 102, the processing power of the electronic device 101 can be leveraged to present content on the display 103 of the content presentation companion device 102. This allows a user to watch television, play video games, work on homework or office work, video call friends and family, engage in videoconferences with co-workers, or perform other tasks using the one or more processors of the electronic device 101 combined with the large display 103 of the content presentation companion device 102.

Using a content redirection feature, a small electronic device 101 such as the smartphone shown in FIG. 1 can connect to connect to a content presentation companion device 102 such as a larger monitor, television, or other device having a larger screen. Using the content redirection feature, users can wirelessly stream video content to the larger display 103 of the content presentation companion device 102 with no loss in performance. Resolution of the images on the content presentation companion device 102 can be as high as 4K with frame rates that present the content 105 without flicker or distortion. In the illustrative embodiment of FIG. 1, neither a cable nor a docking station is required to use the content redirection feature. However, in other embodiments such as the one described below with 5, a docking station can be used. In some embodiments, a docked electronic device or stationary electronic device is a condition requisite for performing alterations of content, as will be described below.

When using the content redirection feature, the electronic device 101 can function as a mouse, trackpad, or other control device while the content 105 is being presented on the content presentation companion device 102. The content redirection feature can be used for presenting pictures, videos, television shows, or movies on the larger display 103 of a content presentation companion device 102. Additionally, it can be used for gaming, videoconferences, and other content presentation tasks.

Embodiments of the disclosure advantageously provide a more intelligent system that dynamically enhances one or both of a user interface and/or image presentation feature by leveraging a larger display of the content presentation companion device 102 that operates in conjunction with the content redirection feature, as a function of a distance between the electronic device 101 and the content presentation companion device 102. For instance, in one or more embodiments a user interface feature being presented on the content presentation companion device 102 can be adjusted as the function of the geometric orientation of the content presentation companion device 102 in three-dimensional space. Effectively, embodiments of the disclosure "decouple" the aspect ratio between the electronic device 101 and the content presentation companion device 102, thereby allowing content to be presented at a display of the electronic device 101 in a first aspect ratio while content is presented at a display of the content presentation companion device 102 in a different aspect ratio. Thus, if content is being presented on a display of the electronic device 101 with a 4:3 aspect ratio, content being delivered to the content presentation companion device 102 may be in a 16:9 aspect ratio as a function of the geometric orientation of the content presentation companion device 102 in three-dimensional space 107.

Before turning to the user interface enhancements and how they are provided, a deeper look into the hardware of the electronic device 101 and the content presentation companion device 102 will be provided. Beginning with the electronic device 101, and turning now to FIG. 2, illustrated therein is one explanatory electronic device 200 configured in accordance with one or more embodiments of the disclosure.

Figure 2:
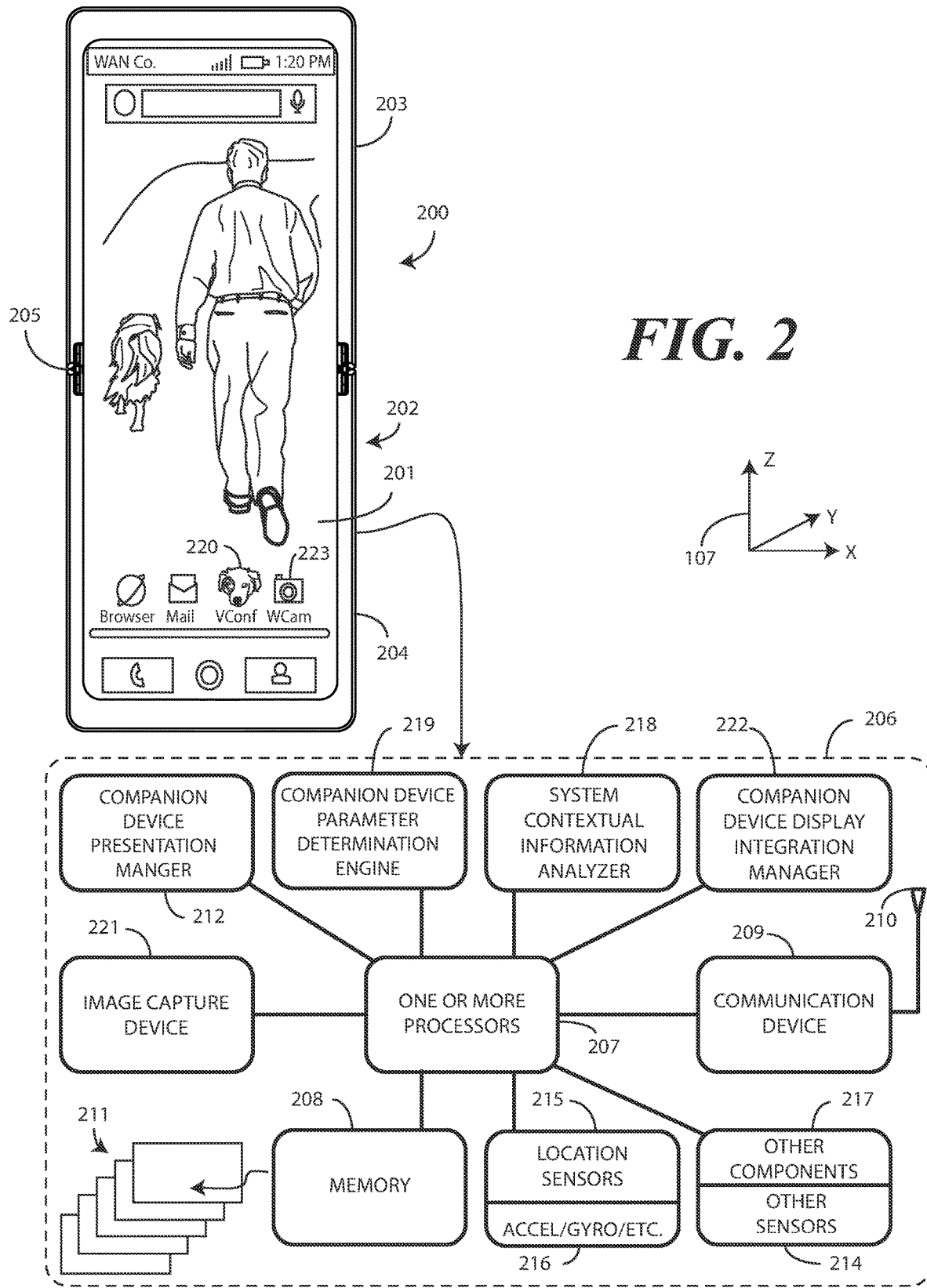
FIG. 2 illustrates one explanatory electronic device in accordance with one or more embodiments of the disclosure.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, such as that associated with the electronic device (101) of FIG. 1, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth. This executable software code can be configured as a videoconference application 220, a webcam application 223, or other applications.

In one embodiment, the one or more processors 207 are responsible for running the operating system environment of the electronic device 200. The operating system environment can include a kernel and one or more drivers, and an application service layer, and an application layer. The operating system environment can be configured as executable code operating on one or more processors or control circuits of the electronic device 200. The application layer can be responsible for executing application service modules. The application service modules may support one or more applications or "apps," such as the videoconference application 220 or webcam application 223.

The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 207 may generate commands or execute control operations based upon user input received at the user interface. Moreover, the one or more processors 207 may process the received information alone or in combination with other data, such as the information stored in the memory 208.

Various sensors 214 can be operable with the one or more processors 207. One example of a sensor that can be included with the various sensors 214 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 214 is a geo-locator that serves as a location detector 215. In one embodiment, location detector 215 determines location data. Location can be determined by capturing the location data from a constellation of one or more earth orbiting satellites, or from a network of terrestrial base stations to determine an approximate location. The location detector 215 may also be able to determine location by locating or triangulating terrestrial base stations of a traditional cellular network, or from other local area networks, such as Wi-Fi networks.

Another example of a sensor that can be included with the various sensors 214 is an orientation detector 216 operable to determine an orientation and/or movement of the electronic device 200 in three-dimensional space 107. Illustrating by example, the orientation detector 216 can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector 216 can determine the spatial orientation of an electronic device 200 in three-dimensional space 107 by, for example, detecting a gravitational direction. In addition to, or instead of, an accelerometer, an electronic compass can be included to detect the spatial orientation of the electronic device 200 relative to the earth's magnetic field. Similarly, one or more gyroscopes can be included to detect rotational orientation of the electronic device 200.

Other components 217 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 217 can also include proximity sensors. The proximity sensors fall in to one of two camps: active proximity sensors and "passive" proximity sensors. Either the proximity detector components or the proximity sensor components can be generally used for gesture control and other user interface protocols.

The other components 217 can optionally include a barometer operable to sense changes in air pressure due to elevation changes or differing pressures of the electronic device 200. The other components 217 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 218 can then be operable with the various sensors to detect, infer, capture, and otherwise determine persons and actions that are occurring in an environment about the electronic device 200. For example, where included one embodiment of the context engine 218 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 218 in detecting multi-modal social cues, emotional states, moods, and other contextual information. The context engine 218 can comprise an artificial neural network or other similar technology in one or more embodiments.

In one or more embodiments, the context engine 218 is operable with the one or more processors 207. In some embodiments, the one or more processors 207 can control the context engine 218. In other embodiments, the context engine 218 can operate independently, delivering information gleaned from detecting multi-modal social cues, emotional states, moods, and other contextual information to the one or more processors 207. The context engine 218 can receive data from the various sensors 214. In one or more embodiments, the one or more processors 207 are configured to perform the operations of the context engine 218.

In one or more embodiments, the context engine 218 detects, the communication device 209 being electronically in communication with a content presentation companion device operating as a display for the electronic device 200. In one or more embodiments, the context engine 218 detects the communication device 209 electrically in communication with the content presentation companion device operating as a primary display for the electronic device 200 while an image capture device 221 captures one or more images from an environment of the electronic device 200.

Additionally, in one or more embodiments the context engine 218 determines, from signals received from the content presentation companion device by the communication device 209, an orientation of the content presentation companion device in three-dimensional space 107. In response to this determination, the one or more processors 207 can determine one or more content input parameters required by the content presentation companion device to present content on its display. Where the geometric orientation of the content presentation companion device and the geometric orientation of the electronic device 200 differ, these one or more content input parameters will differ from one or more content output parameters associated with the display 201 of the electronic device 200. Accordingly, the one or more processors 207 will need to alter content being presented on a display of the electronic device to create altered content meeting the one or more content input parameters required for the presentation of the content presentation companion device. Examples of these one or more content input parameters include an aspect ratio, an image orientation, and a field of view. Other examples of such content input parameters were described above with reference to FIG. 7.

In one or more embodiments, the electronic device 200 also includes a content parameter modification engine 219. In one or more embodiments, the content parameter modification engine 219 alters content generated by one or more applications operating on the one or more processors 207 and/or one or more images captured by the image capture device 221 to create altered content meeting the one or more content input parameters required for the altered content to be presented on a content presentation companion device. In one or more embodiments, the content parameter modification engine 219 alters the content prior to the communication device 209 delivering the content to the content presentation companion device for presentation.

Illustrating by example, in one or more embodiments the content parameter modification engine 219 alters the content by changing an image orientation of the content. If the one or more content input parameters require a landscape orientation for presentation on the content presentation companion device, and applications operating on the one or more processors 207 are generating content in a portrait image orientation, the one or more processors 207 will alter the content being delivered to the content presentation companion device by transitioning the content from the portrait image orientation to the landscape image orientation. In one or more embodiments, this requires reorienting and/or rearranging the content. In one or more embodiments, this altering occurs while the content being presented on the display 201 of the electronic device 200 is being presented in a portrait orientation.

The opposite can occur as well. If the one or more content input parameters require a portrait orientation for presentation on the content presentation companion device, and applications operating on the one or more processors 207 are generating content in a landscape image orientation, the one or more processors 207 will alter the content being delivered to the content presentation companion device by transitioning the content from the landscape image orientation to the portrait image orientation. Again, this can require reorienting and/or rearranging the content. In one or more embodiments, this altering occurs while the content being presented on the display 201 of the electronic device 200 is being presented in a landscape orientation.

Effectively, the electronic device 200 delivers content to a content presentation companion device based upon the geometric orientation of the content presentation companion device in three-dimensional space 107. If, for example, the electronic device 200 is in the landscape orientation and the content presentation companion device is in the portrait orientation, the content delivered from the electronic device 200 to the content presentation companion device will be in the portrait orientation. This occurs despite the fact that the same content may be being concurrently presented in a different orientation on the display 201 of the electronic device 200. The net result is that a natural preview on the display 201 of the electronic device 200 occurs regardless of whether a person is looking at the display 201 of the electronic device 200 or the display of the content presentation companion device, and regardless of whether these two displays are oriented differently in three-dimensional space 107.

In one or more embodiments, the content parameter modification engine 219 can modify the content by changing an aspect ratio of the content. The content parameter modification engine 219 may change a 4:3 aspect ratio to a 16:9 aspect ratio, a 3:4 aspect ratio, or a 9:16 aspect ratio, for example.

The content parameter modification engine 219 can also modify the content by rearranging the content. Where the content is being presented being presented on the display 201 of the electronic device 200 in a first arrangement, for example, the content parameter modification engine 219 may rearrange the content to create altered content arranged in a second arrangement that is different from the first arrangement. These arrangements can be different despite the fact that the content being presented on the display 201 of the electronic device 200 and that being presented on the display of the content presentation companion device contain the same information.

In one or more embodiments, the content parameter modification engine 219 modifies the content in response to signals received from a content presentation companion device through the communication device 209 that are processed by the context engine 218. In one or more embodiments, the one or more content input parameters require at least one content input parameter to be different from the one or more content output parameters associated with the application operating on the one or more processors 207 and generating the content.

Where the content includes one or more images being captured by the image capture device 221, such as would occur when the content comprises a videoconference user interface, an image capture user interface, or other similar interface, the content parameter modification engine 219 may additional crop the one or more images captured by the image capture device 221 with a crop mask to alter the interface such that it matches a content presentation orientation of the content presentation companion device. The content parameter modification engine 219 can also determine a region of interest within the one or more images. Where this occurs, the content parameter modification engine 219 can position the crop mask such that the region of interest is situated within the one or more cropped images. In one or more embodiments, the region of interest depicts a subject of the one or more cropped images.

The content parameter modification engine 219 can also detect movement of objects within the region of interest. Illustrating by example, where the one or more cropped images comprise a plurality of images, the content parameter modification engine 219 can detect movement of a subject within at least some cropped images of the plurality of cropped images. When this occurs, the content parameter modification engine 219 can move the crop mask to maintain depictions of the subject that are substantially centered or perfectly centered within the plurality of cropped images.

In one or more embodiments, the content parameter modification engine 219 perform these functions under only certain conditions. Illustrating by example, in one or more embodiments the motion detector 216 is configured to determine when the electronic device 200 is moving. Where this occurs, the content parameter modification engine 219 can alter the content, user interface, and/or one or more images captured by the image capture device 221 to create the altered content meeting the one or more content input parameters required for presentation of the one or more altered images on the content presentation companion device only when the electronic device 200 is substantially stationary or, alternatively, perfectly stationary.

The same can occur with reference to a docking station, such as the one that will be described below with reference to FIG. 5. In one or more embodiments, the content parameter modification engine 219 alters the content to create the altered content only when the one or more sensors 214 detect that the electronic device 200 is coupled to a docking station. Alternatively, the content parameter modification engine 219 may be configured to alter the content to create the altered content only when the one or more sensors 214 detect that the electronic device 200 is coupled to a docking station while the electronic device 200 is engaged in a videoconference.

A content presentation companion device integration manager 222 is operable to perform content redirection operations. In one or more embodiments, the content presentation companion device integration manager 222 allows the one or more processors 207 of the electronic device 200 to connect to a content presentation companion device such as a larger monitor, television, or other device having a larger screen. The content presentation companion device integration manager 222 then facilitates wireless streaming of content to the larger display of a content presentation companion device. In one or more embodiments, neither a cable nor a docking station is required for the content presentation companion device integration manager 222 to redirect content to another device. Instead, the content presentation companion device integration manager 222 employs the communication device 209 and the one or more antennas 210 to transmit content to a content presentation companion device.

The inclusion of the content presentation companion device integration manager 222 allows the electronic device 200 to be used as a mouse, trackpad, or other control device while content is being presented on the content presentation companion device. The content presentation companion device integration manager 222 can be used for presenting pictures, videos, television shows, or movies on the larger display of a content presentation companion device. Additionally, the content presentation companion device integration manager 222 can facilitate gaming, video conferences, and other content presentation tasks using the display of a content presentation companion device as well.

In one or more embodiments, the content presentation companion device integration manager 222 dynamically enhances one or both of a user interface and/or an audio performance characteristic of a content presentation companion device as a function of the geometric orientation of the content presentation companion device in three-dimensional space 107. For instance, in one or more embodiments the content presentation companion device integration manager 222 can adjust a user interface feature being presented on a content presentation companion device as a function of the geometric orientation of the content presentation companion device. Other user interface enhancements will be described below. Still others will be obvious to those of ordinary skill in the art having the benefit of this disclosure.

In one or more embodiments, the content that is altered by the one or more processors 207 is generated by an application operating on the one or more processors 207. In one or more embodiments, the application may either be unable to generate content meeting the one or more content input parameters or may be unaware that a content presentation companion device is even being used. The one or more processors 207, in conjunction with the content presentation companion device integration manager 222, thus serve as an interface to control and adjust the arrangement, orientation, and other aspects of the content so that they match the one or more content input parameters required by the content presentation companion device for presentation. For instance, where the application operating on the one or more processors 207 generate the content in accordance with one or more content output parameters, and at least one of the one or more content output parameters differs from the one or more content input parameters required by the content presentation companion device, the one or more processors 207 can alter the content to match the one or more content input parameters. In one or more embodiments, this occurs as a function of the orientation of the content presentation companion device in three-dimensional space 107.

It is to be understood that FIG. 2 is provided for illustrative purposes only and for illustrating components of one electronic device 200 in accordance with embodiments of the disclosure and is not intended to be a complete schematic diagram of the various components required for an electronic device. Therefore, other electronic devices configured in accordance with embodiments of the disclosure may include various other components not shown in FIG. 2 or may include a combination of two or more components or a division of a particular component into two or more separate components, and still be within the scope of the present disclosure.

The electronic device 200 can be operable with a video conferencing system server complex across a network. The video conferencing system server complex can be configured with performing processor-intensive methods, operations, steps, functions, or procedures associated with the presentation, actuation, and management of indicia during a videoconference. Illustrating by example, the video conferencing system server complex can be configured to receive one or more images in a video feed of a videoconference across a network. A communication device can then deliver the one or more videoconference feeds to other conferencing system terminal devices.

Figure 3:
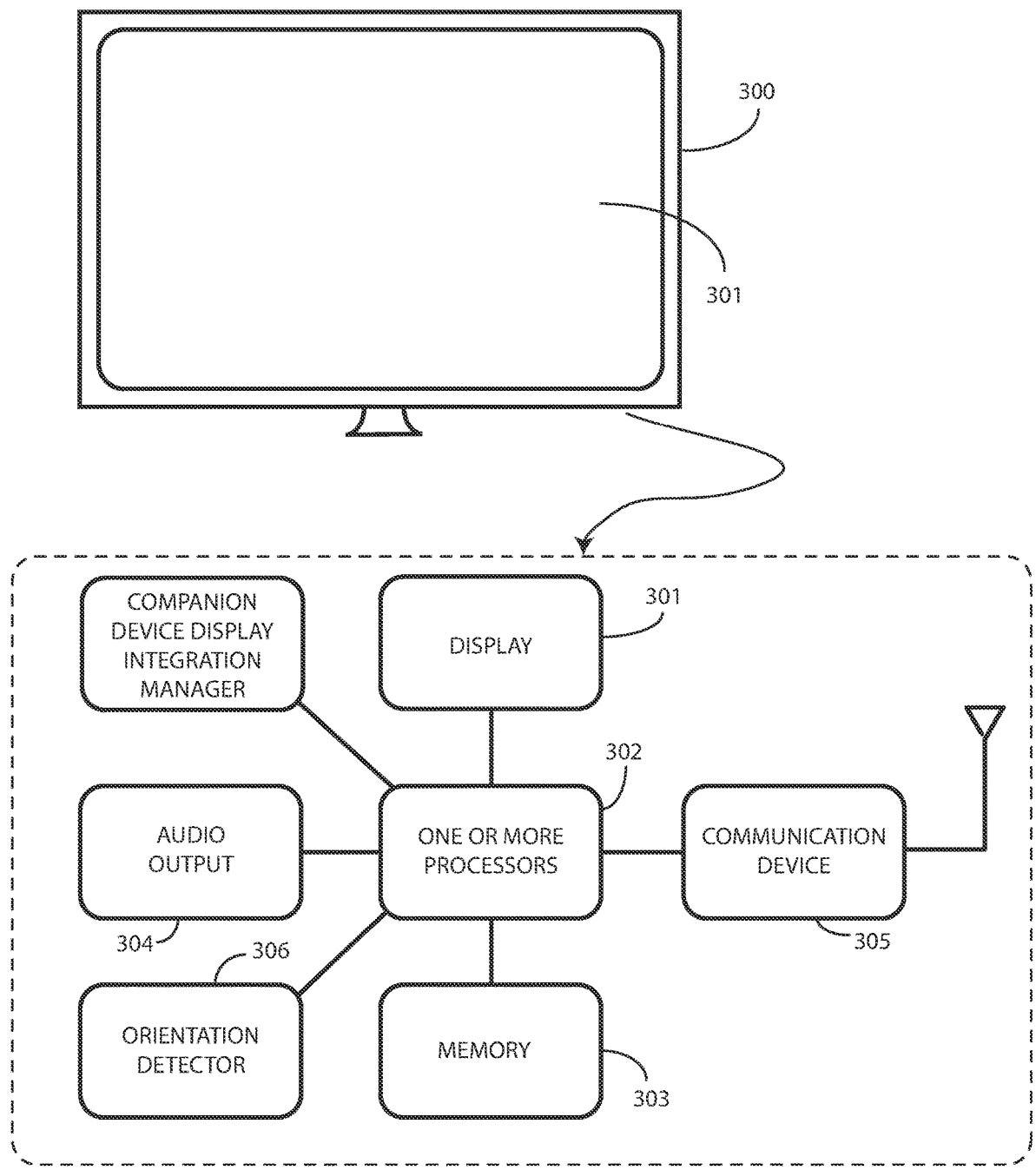
FIG. 3 illustrates one explanatory content presentation companion device in accordance with one or more embodiments of the disclosure.

Embodiments of the disclosure contemplate that electronic devices configured as described herein and used in videoconferencing applications can be operable with companion devices in a "ready for" environment. Illustrating by example, the electronic device 200 can include a companion device display integration manager 212. The companion device display integration manager 212 can be used to communicate with a companion electronic device, one example of which is a content presentation companion device. Turning now to FIG. 3, illustrated therein is one such content presentation companion device 300.

In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure.

Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2 or the electronic device (101) of FIG. 1. An orientation detector 306 can determine whether the content presentation companion device 102 is in a portrait orientation or a landscape orientation.

In one or more embodiments, when coupled by a wireless connection to such an electronic device (200), the content presentation companion device 300 can function as an auxiliary display for the electronic device (200). The electronic device (200) can receive content, one example of which includes one or more videoconference feeds, from a terrestrial broadcast network, cable television network, videoconference server, Internet streaming service, or combinations thereof, and redirect this content to the content presentation companion device 300 (using its companion device display integration manager) since its display 301 is larger than the display (201) of the electronic device 200. In one or more embodiments, content flows from the electronic device 200 to the content presentation companion device 300 through the communication device 305.

Figure 4A:
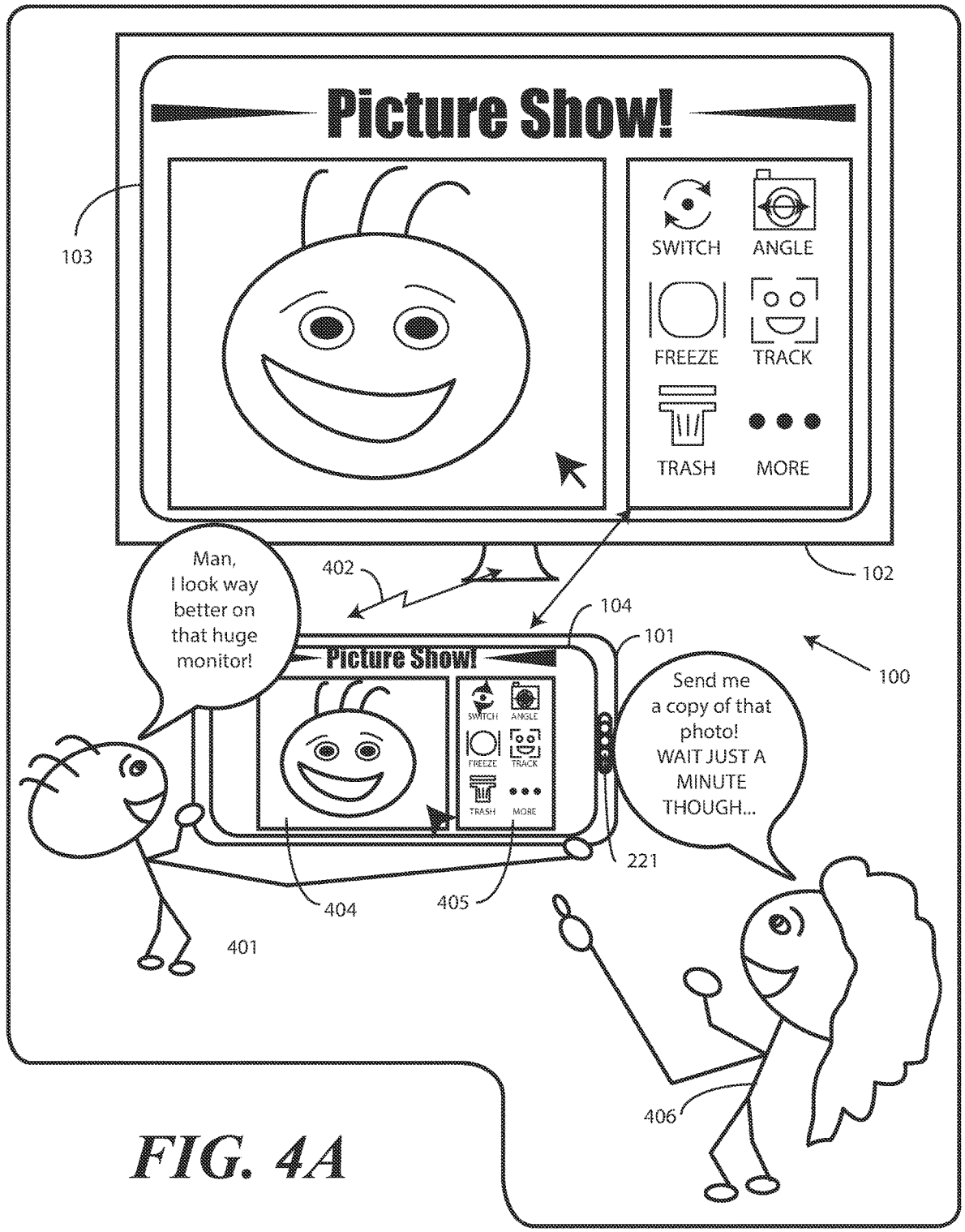
FIG. 4A illustrates one or more explanatory method steps in accordance with one or more embodiments of the disclosure.

Turning now to FIG. 4A, a person 401 is using the electronic device 101 of FIG. 1. One or more processors (207) of the electronic device 101 are running an application, which in this illustrative example is a self-picture capture application that allows the person 401 to take pictures of himself and share them with others. While this is one application operable with the one or more processors (207) that will be used for discussion, the application could be any number of applications including a videoconference application or other applications.

As shown in FIG. 4A, the electronic device 101 is electronically in communication with the content presentation companion device 102. When the electronic device 101 is electronically in communication with the content presentation companion device 102, this allows the content presentation companion device integration manager (222) of the electronic device 101 to exploit the larger display 103 of the content presentation companion device 102 to present content.

In this example, the larger display 103 of the content presentation companion device 102 is mirroring the content being presented on the display 104 of the electronic device 101. Said differently, the communication device (209) of the electronic device 101 is electronically in communication with the content presentation companion device 102 while the content presentation companion device 102 is operating as a primary display for the electronic device 101.

In this illustrative embodiment, the content generated by the application operating on the one or more processors (207) includes an image portion 404 depicting one or more images being captured by the image capture device 221 of the electronic device 101 and a user interface portion 405. The user interface portion 405 allows the person 401 to manipulate the one or more images by actuating various user icons configured as user actuation targets. In this example, the user icons allow the person 401 to switch between image capture devices, freeze video being captured by the image capture device 221, switch to a wide-angle lens, perform facial tracking, discard images or video, and perform other operations.

In other embodiments, the electronic device 101 can operate in a "desktop" mode by presenting a traditional computer user interface on the display 103 of the content presentation companion device 102. Alternatively, the electronic device 101 may present content such as videos, images, or other multimedia content on the display 103 of the content presentation companion device 102.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, engaging in videoconferences, and so forth. By establishing an electronic communication channel between the electronic device 101 and the content presentation companion device 102, the processing power of the electronic device 101 can be leveraged to present content on the display 103 of the content presentation companion device 102. This allows a person 401 to watch television, play video games, work on homework or office work, video call friends and family, engage in videoconferences, or perform other tasks using the one or more processors (207) and the content presentation companion device integration manager (222) of the electronic device 101 combined with the large display 103 of the content presentation companion device 102.

In one or more embodiments, one or more processors (207) of the electronic device 101 first determine that the electronic device 101 is electronically in communication with the content presentation companion device 102. This determination can optionally include determining that the content presentation companion device integration manager (222) is using the display 103 of the content presentation companion device 102 as a primary display for the electronic device 101. In one or more embodiments, the one or more processors (207) of the electronic device 101 use the communication device (209) of the electronic device 101 to detect that the electronic device 101 is electronically in communication with the content presentation companion device 102.

In one or more embodiments, the one or more processors (207) of the electronic device 101 receive signals 402 indicating a geometric orientation of the content presentation companion device 102 in three-dimensional space. In this illustration, both the electronic device 101 and the content presentation companion device 102 are oriented in the landscape orientation in three-dimensional space.

Accordingly, on both the display 104 of the electronic device 101 and the display 103 of the content presentation companion device 102 the content is being presented in a landscape image orientation with the image portion 404 and the user interface portion 405 situated in a side-by-side arrangement with the image portion 404 situated to the left of the user interface portion 405.

Both the person 401 and his friend 406 are relatively pleased with the large, clear picture being presented on the display 103 of the content presentation companion device 102. However, the friend 406, understanding that the electronic device 101 is configured in accordance with embodiments of the disclosure, as an idea that may improve the user experience even more so.

Figure 4B:
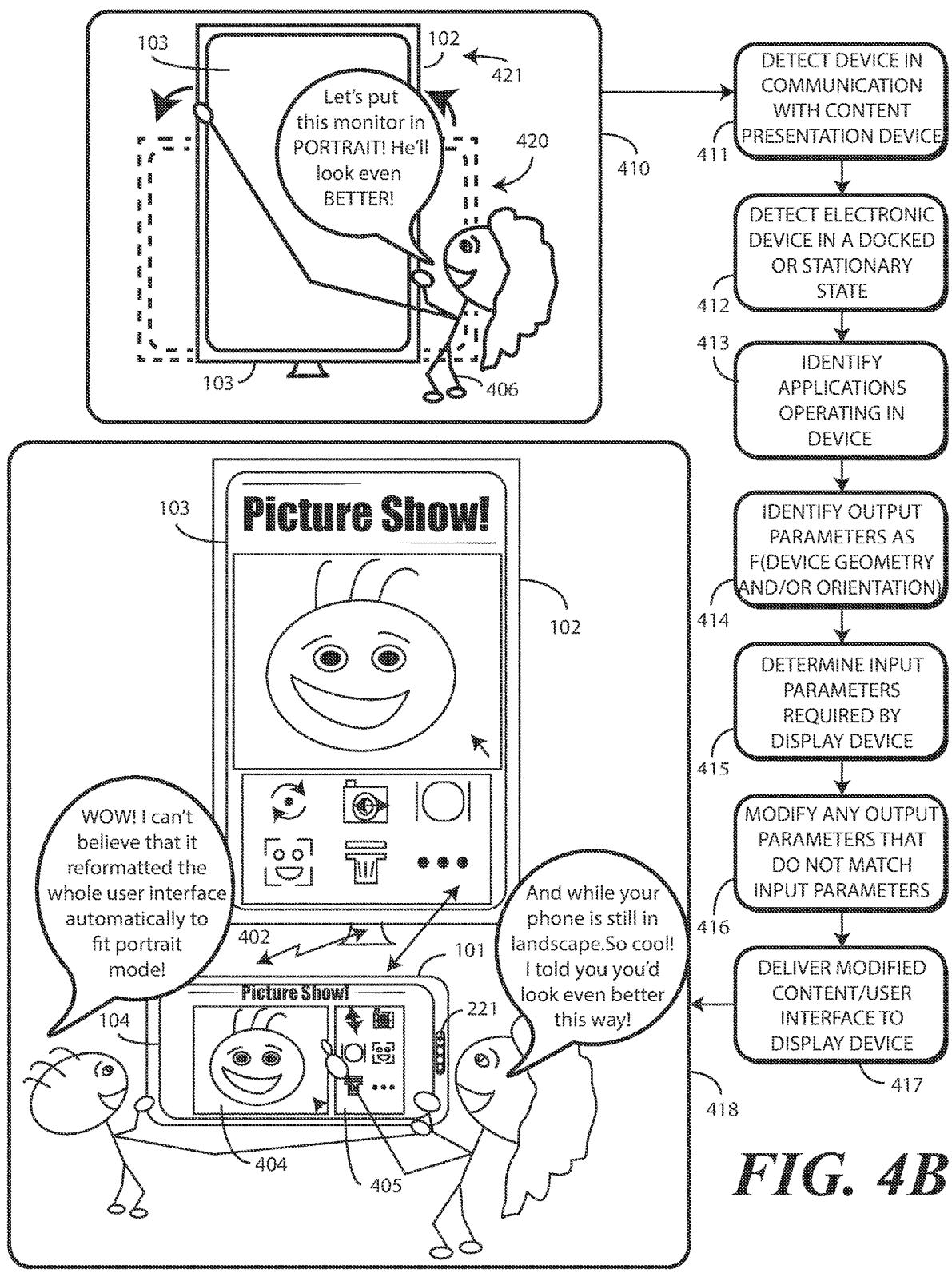
FIG. 4B illustrates one or more explanatory method steps in accordance with one or more embodiments of the disclosure.
Figure 10:
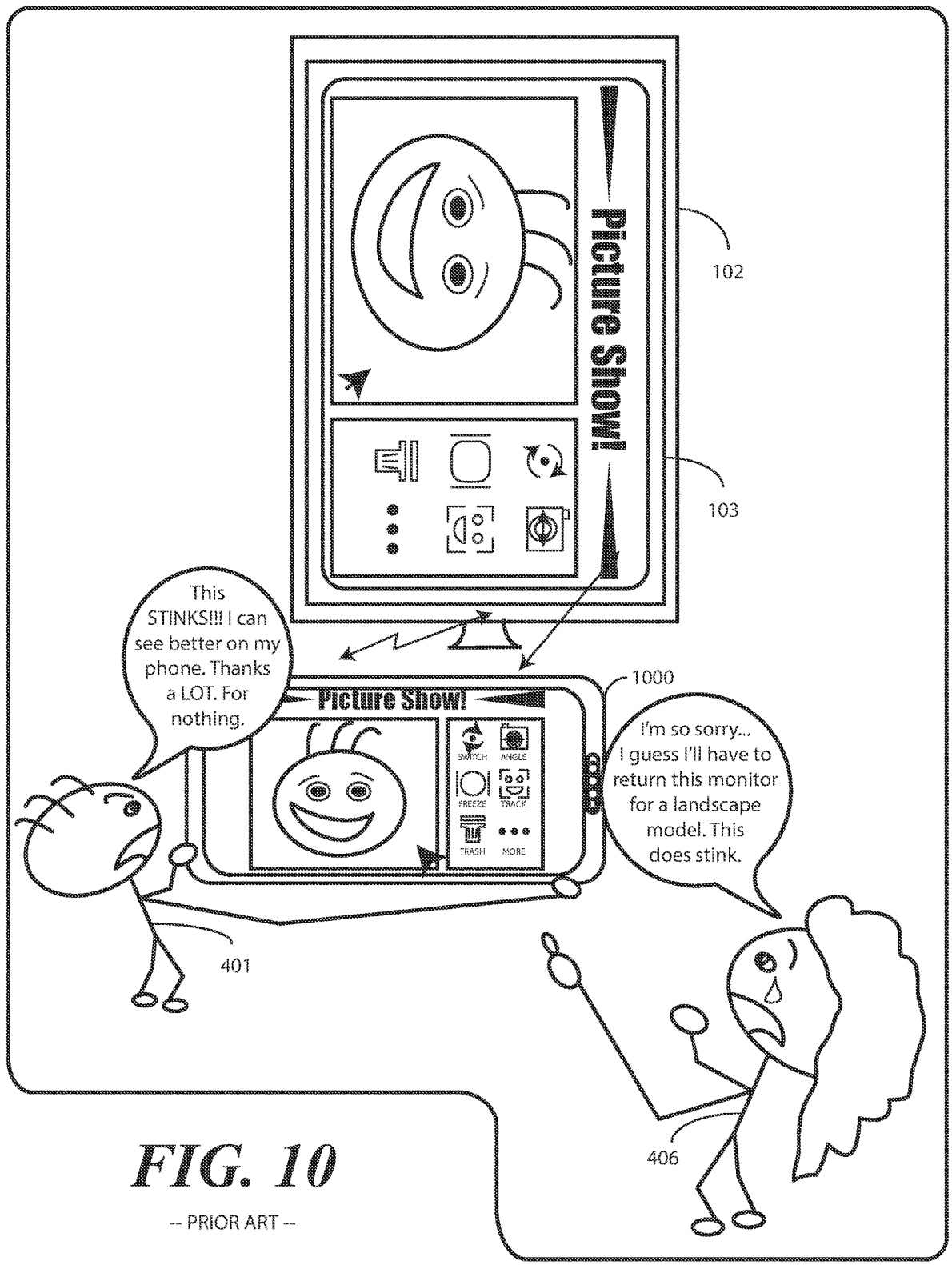
FIG. 10 illustrates a prior art system.

Turning now to FIG. 4B, at step 410 the friend 406 rotates the content presentation companion device 102 from a landscape orientation 420 to a portrait orientation 421. With a prior art device, this pivot would not improve the situation whatsoever. Turning briefly to FIG. 10, illustrated therein is what would happen.

As shown in FIG. 10, if the person 401 were using a prior art electronic device 1000, the content would be pivoted with the content presentation companion device 102, which results in the content being turned sideways and being far less pleasant to view. This occurs due to the fact that the application operating on the one or more processors of the electronic device 1000 that generates the content in the form of the image capture portion 404 and the user interface portion 405 has no knowledge that the content presentation companion device 102 is being used as a primary display for the electronic device 1000. Instead, the application simply renders the content in a landscape image orientation because this is an optimal way to view the content on the display of the prior art electronic device 1000. If the person 401 turns the electronic device 1000 to the portrait orientation, large black bars would appear above and below the content. For this reason, the person 401 rotates the electronic device 1000 to the portrait orientation to accommodate the fixed content generation operations being performed by the application.

Since the application is unaware that the content presentation companion device 102 is operating with the electronic device 1000, the application simply renders the content in the landscape image orientation. Accordingly, when the friend 406 pivots the content presentation companion device 102 to the portrait orientation, the content pivots with it. This results in the image capture portion 404 turning sideways and showing depictions of the person 401 in an unorthodox sideways view. Moreover, the user interface portion 405 turns sideways as well, with text running from top to bottom rather than left to right. This not only makes viewing the content more difficult, but also makes navigating the user actuation targets incredibly difficult as the person 401 must correlate left to right movements along the display of the electronic device 1000 with top to bottom movements as viewed on the display of the content presentation companion device 102. This leads to great frustration of the person 401, who blames the friend 406, who starts crying due to the fact that their friendship has become strained by the pivoting gaffe resulting in the sideways content. The whole scene is a complete mess, as no one is happy.

Embodiments of the disclosure prevent all of this from occurring, thereby ensuring that the person 401 and the friend 406 remain blissfully happy and the best of friends. To wit, rather than allowing the application to simply generate output in one, static, fixed orientation mode, one or more processors—optionally operating in tandem with context analyzer, content parameter modification engine, and/or content presentation companion device integration manager—detect that a communication device of an electronic device is electronically in communication with a content presentation companion device. In one or more embodiments, the content presentation companion device is operating as a primary display for the electronic device.

One or more processors of the electronic device then determine from signals received from the content presentation companion device a geometric orientation of the content presentation companion device in three-dimensional space defining one or more content input parameters required for content presentation on the content presentation companion device. The one or more processors then alter the content being generated by the application to create altered content meeting the one or more content input parameters required for the presentation on the content presentation companion device. Turning now back to FIG. 4B, illustrated therein are one or more method steps illustrating how this can occur.

At step 411 one or more processors (207) of the electronic device 101 detect the communication device (209) of the electronic device 101 electronically in communication with the content presentation companion device 102. At step 411, the one or more processors (207) of the electronic device 101 optionally detect that the content presentation companion device 102 is being used as a primary display for the electronic device 101.

At optional step 412, one or more processors (207) of the electronic device 101 determine whether the electronic device 101 is docked or substantially stationary while the content presentation companion device 102 is being used as the primary display for the electronic device 101. Illustrating by example, in one or more embodiments step 412 comprises detecting the electronic device 101 being coupled to a docking station while the application is generating the content being delivered to the content presentation companion device 102. Step 412 can also comprise determining, using one or more sensors (214) of the electronic device 101, whether the electronic device 101 is moving, is substantially stationary, or is perfectly stationary. In one or more embodiments, these determinations can be used as a condition precedent for altering the content being generated by the application operating on the one or more processors (207) of the electronic device 101, and prior to the communication device (209) delivering the same to the content presentation companion device 102.

At step 413, the one or more processors (207) of the electronic device 101 identify the application operating on the one or more (207) and generating the content. At step 414, the one or more processors (207) of the electronic device 101 determine one or more content output parameters associated with that application. In this example, which follows the steps shown in FIG. 4A, an application operating on the one or more processors (207) of the electronic device 101 is an image capture application that generates content including an image portion 404 depicting one or more images being captured by the image capture device 221 of the electronic device 101 and a user interface portion 405. As noted above, the one or more content output parameters dictate that this content is generated in a landscape image orientation.

While the application is an image capture application, the techniques described below with reference to FIG. 4B could be equally applied to other applications as well, including videoconferencing applications or other applications. Where the application is a videoconference application, for example, an image capture portion 404 and user interface portion 405 would still be generated so that the person 401 could navigate the videoconference. Thus, the steps described below are "application independent" in that they can be applied to any number of different application types.

The one or more content output parameters associated with the application that are determined at step 414 can include parameters other than landscape image orientation and portrait image orientation. Examples of the one or more content output parameters include an aspect ratio of the content, a field of view of the content, a frame rate associated with the content, and so forth. Other examples will be described below with reference to FIG. 7. Still others will be obvious to those of ordinary skill in the art having the benefit of this disclosure.

At step 415, the communication device (209) of the electronic device 101 receives electronic signals 402 indicating a geometric orientation of the content presentation companion device 102 in three-dimensional space. In one or more embodiments, these electronic signals 402 directly query one or more sensors of the content presentation companion device 102 due to the tandem operating relationship between the electronic device 101 and the content presentation companion device 102 and the control being executed for the combined system by the one or more processors (207) of the electronic device 101.

Other techniques for determining the geometric orientation of the content presentation companion device 102 can be used as well. Illustrating by example, in other embodiments when the electronic device 101 establishes a paired connection with the content presentation companion device 102, one or more processors (207) of the electronic device 101 can cause the communication device (209) to broadcast a list to output parameter types with which the content from the application can be presented to make them available for selection by one or more circuits situated within the content presentation companion device 102. Processors of the content presentation companion device 102 then select the one or more content input parameters from the list and make a request by delivering electronic signals 402 identifying the selected content input parameters to the communication device (209) of the electronic device 101.

Thus, in one or more embodiments step 415 comprises determining, by the one or more processors (207) of the electronic device 101 from signals 402 received from the content presentation companion device 102 by the communication device (209) of the electronic device 101, a geometric orientation defining one or more content input parameters required by the content presentation companion device 102 for optimal presentation on the display 103 of the content presentation companion device 102. In this example, since the friend 406 pivoted the content presentation companion device 102 to the portrait orientation 421 from the landscape orientation 420, the geometric orientation requires a content input parameter that the content be arranged in a portrait image orientation. Since the electronic device 101 is still in the landscape orientation, this at least one content input parameter differs from at least one content output parameter associated with the application.

In one or more embodiments, at least one content input parameter identified at step 415 differs from at least one content output parameter associated with the application identified at step 414. Thus, in one or more embodiments step 415 comprises the one or more processors (207) of the electronic device 101 executing the application receiving electronic signals 402 from the content presentation companion device 102 that identify one or more content input parameters defined by the geometric orientation of the content presentation companion device 102 in three-dimensional space that differ from at least one content output parameter associated with the application operating on the one or more processors (207) of the electronic device 101.

At step 416, the one or more processors (207) of the electronic device alter content being presented on the display 104 of the electronic device 101 as a function of the geometric orientation of the content presentation companion device 102 in three-dimensional space, as identified at step 415, to obtain altered content. Said differently, the one or more processors (207) of the electronic device 101 executing the application generating the content for presentation on the display 103 of the content presentation companion device 102 alter the content to create altered content meeting the one or more content input parameters identified at step 415 and required for presentation of the content on the display 103 of the content presentation companion device 102. In one or more embodiments, this altering occurring at step 416 causes content being presented on the display 104 of the electronic device 101 and the altered content being presented on the display 103 of the content presentation companion device 102 to be arranged differently, as shown at step 418. This alteration occurring at step 416 can occur in a variety of ways.

In one or more embodiments, the one or more content input parameters identified at step 415 and required for presentation of the altered content on the display 103 of the content presentation companion device 102 that differ from the one or more content output parameters of the application comprise an aspect ratio of the one or more images presented in the image portion 404 of the content. Accordingly, in one or more embodiments the altering occurring at step 416 comprises changing the aspect ratio of the one or more images presented in the image portion 404 to a different aspect ratio required for presentation of the altered content on the display 103 of the content presentation companion device 102.

In one or more embodiments, the one or more content input parameters identified at step 415 and required for presentation of the altered content on the display 103 of the content presentation companion device 102 that differ from the one or more content output parameters associated with the application comprise an image orientation of images depicted in the image portion 404. Accordingly, in one or more embodiments the altering occurring at step 416 comprises changing the image orientation of the one or more images of the image portion 404 to a different image orientation required for presentation of the altered content on the display 103 of the content presentation companion device 102. This step 415 can comprise changing a portrait image orientation to a landscape image orientation, or vice versa.

In one or more embodiments, the one or more content input parameters identified at step 415 and required for presentation of the altered content on the display 103 of the content presentation companion device 102 that differ from the one or more content output parameters associated with the application comprise an image size of the one or more images presented in the image portion 404. Accordingly, in one or more embodiments the altering occurring at step 416 comprises changing the image size of the one or more images presented in the image portion 404 to a different image size required for presentation of the altered content on the display 103 of the content presentation companion device 102.

In one or more embodiments, this comprises cropping the one or more images presented in the image portion 404 with a crop mask matching the content orientation of the image portion 404 appearing on the display 103 content presentation companion device 102 to create one or more cropped images at step 416. In one or more embodiments, the crop mask is positioned such that the region of interest defined within the one or images is situated within the one or more cropped images. Where the region of interest depicts a subject of the region of interest, here person 401, this results in the depictions of the subject being situated within the crop mask. The one or more processors (207) of the electronic device 101 can include a generative artificial intelligence engine detecting movement of the subject and/or region of interest. Where it does, step 416 can comprise moving the crop mask to maintain depictions of the subject substantially centered within the one or more cropped images.

As noted above in the description of step 411, in one or more embodiments a docked operating condition or a substantially stationary condition or a perfectly stationary condition of the electronic device is a prerequisite for step 416 to occur. Accordingly, where optional step 411 is included, in one or more embodiments step 416 alters the content to create the altered content for presentation on the display 103 of the content presentation companion device 102 only when the electronic device 101 is substantially stationary. In another embodiment, step 416 alters the content to create the altered content for presentation on the display 103 of the content presentation companion device 102 only when the electronic device 101 is perfectly stationary.

In another embodiment, one example of which will be described below in FIG. 5, step 416 alters the content to create the altered content for presentation on the display 103 of the content presentation companion device 102 only when the electronic device 101 is coupled to a docking station.

At step 417, one or more processors (207) of the electronic device 101 cause the communication device (209) of the electronic device 101 to deliver the altered content to the content presentation companion device 102 for presentation on the display 103 of the content presentation companion device 102. In one or more embodiments, this altered content comprise one or more images, which may be presented in an image portion 404 of the content. If the application had been a videoconference application instead of an image capture application, the one or more processors (207) may also cause the communication device (209) of the electronic device 101 to deliver the one or more images from the image portion 404 to at least one remote electronic device engaged in the videoconference as well at step 417.

As shown at step 418, the electronic device 101 is positioned in a landscape orientation in three-dimensional space while the geometric orientation of the content presentation companion device 102 in three-dimensional space is a portrait orientation. The one or more processors (207) of the electronic device 101 are operating one or more applications generating the content being presented on the display 104 of the electronic device 101 in accordance with one or more content output presentation parameters associated with the content and identified at step 414. Here, these one or more content output parameters are different from the one or more content input parameters identified at step 415 and required for content presentation on the content presentation companion device 102. At least one of these content input parameters is defined by the geometric orientation of the content presentation companion device 102 in the three-dimensional space.

As also shown at step 418, the content being presented on the display 104 of the electronic device 101 and the display 103 of the content presentation companion device 102 comprises one or more images set forth in the image portion 404 of the content. In this illustrative example, the one or more processors (207) have altered the content being presented on the display 104 of the electronic device 101 to obtain altered content configured in accordance with the one or more content input parameters required for the content presentation on the content presentation companion device 102 and defined by the geometric orientation of the content presentation companion device 102 in the three-dimensional space by rearranging the one or more images presented in the image portion 404 relative to the user interface portion 405. Specifically, while the image portion 404 and the user interface portion 405 are presented on the display 104 of the electronic device 101 in a side-by-side relationship, on the display 103 of the content presentation companion device the one or more images presented in the image portion 404 are situated atop the user interface portion.

Figure 5:
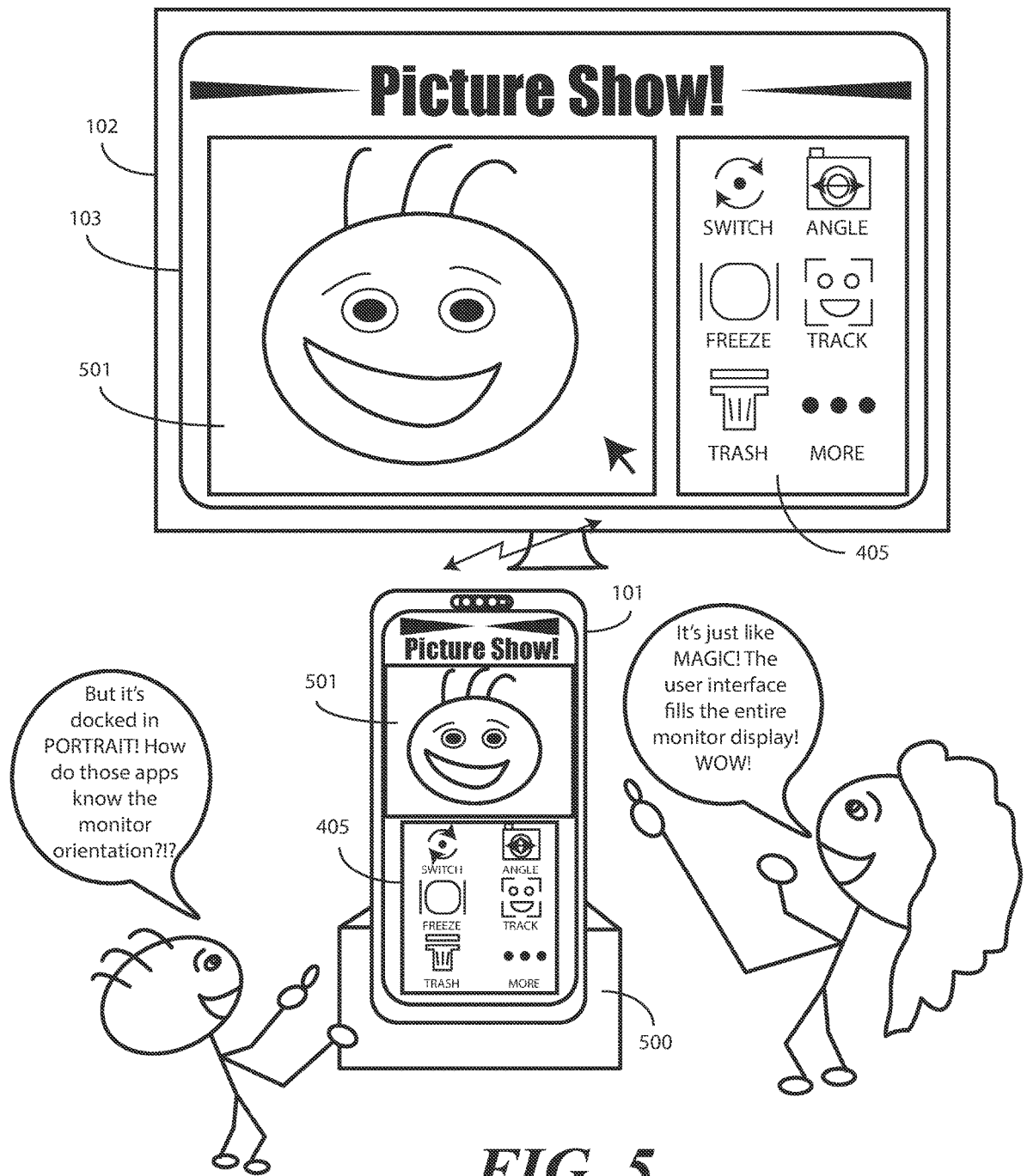
FIG. 5 illustrates one explanatory system in accordance with one or more embodiments of the disclosure.

Turning now to FIG. 5, the opposite is true. As shown, the electronic device 101 is coupled to a docking station 500. The electronic device 101 is in a portrait orientation, while the content presentation companion device 102 that is electronically in communication with the electronic device 101 and operating as a primary display for the electronic device 101 is in the landscape orientation. Accordingly, while the content being presented on the display 104 of the electronic device 101 includes one or more images 501 situated atop the user interface portion 405, the altered content being presented on the display 103 of the content presentation companion device 102 comprises the one or more images 501 situated beside the user interface portion 405.

Figure 6:
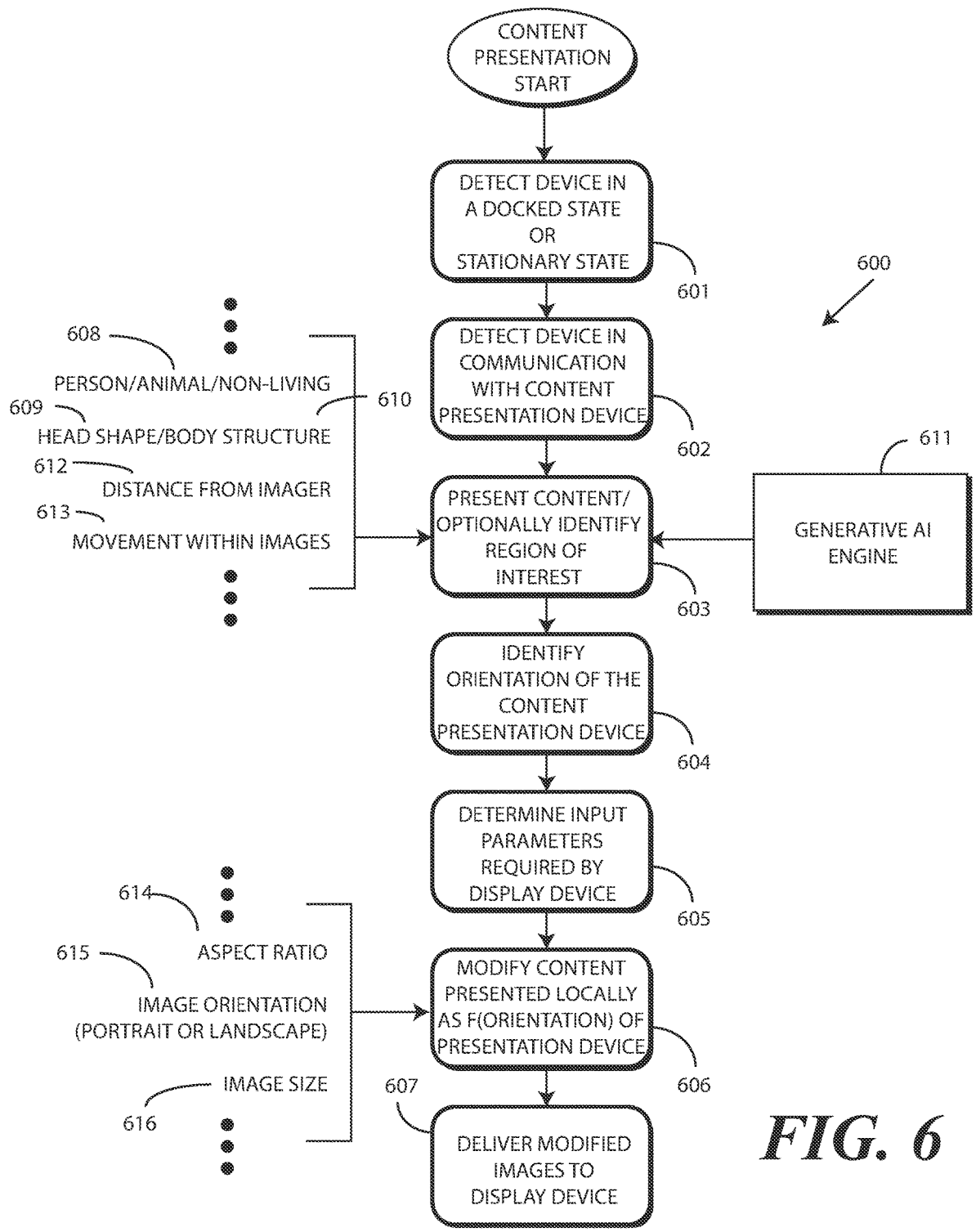
FIG. 6 illustrates one explanatory method in accordance with one or more embodiments of the disclosure.

Turning now to FIG. 6, illustrated therein is another method 600 configured in accordance with one or more embodiments of the disclosure. Beginning at step 601, one or more sensors of an electronic device detect whether the electronic device is in a stationary or docked condition. As noted above, embodiments of the disclosure contemplate that when the content presentation companion device is being used as a primary display for the electronic device, it will frequently be the case that the electronic device is still—either by sitting on a desk or by being placed in a docking station (500) as shown in FIG. 5 above. Moreover, alteration of content being generated by the electronic device to meet the one or more content input parameters required by the content presentation companion device may only be desirable in circumstances where the electronic device is being used in this "ready for" configuration. Accordingly, in one or more embodiments step 601 first determines, with one or more sensors of the electronic device, whether the electronic device is in a docked or stationary condition.

At step 602, one or more processors of the electronic device determine that a communication device of the electronic device is in communication with the content presentation companion device while (1) the content presentation companion device is being used as a primary display for the electronic device and (2) while an application operating on one or more processors of the electronic device is generating content for presentation on a display.

At step 603, content from the application is generated. As noted above, the content can include an image portion depicting one or more images are captured by an image capture device of the electronic device at step 603. In one or more embodiments, step 602 and step 603 can occur in tandem. Step 602 can determine that a communication device of the electronic device is electronically in communication with a content presentation companion device operating as a display or primary display of the electronic device while content is being generated using an image capture device of the electronic device capturing one or more images from an environment of the electronic device at step 603.

In one or more embodiments, step 603 also comprises determining a region of interest within the one or more images of the content. In one or more embodiments, the region of interest is defined by depictions of a subject 608, which could be any of a person, an animal, a non-living object, or combinations thereof. Where the subject 608 comprises a person, an orientation of the person within the region of interest can be determined by a head shape 609 of the person. Where the subject 608 is an animal, the orientation of the animal within the region of interest can be determined by a body structure 610 of the animal.

Step 603 can be performed by a generative artificial intelligence engine 611 that assists in identifying the region of interest, determining the orientation of the subject 608, movement of the subject 608, and so forth. Illustrating by example, in one or more embodiments the generative artificial intelligence engine 611 detect movement 613 of the subject 608 within the one or more images presented in the content at step 603 and cause the region of interest to move to keep the subject 608 substantially centered within the region of interest. Similarly, the generative artificial intelligence engine 611 can use a distance 612 between the subject 608 and the image capture device of the electronic device as a factor in identifying the region of interest, and so forth. In one or more embodiments, the generative artificial intelligence engine 611 that includes an artificial neural network or other similar technology that detects the contextual information and identifies, as a function of this contextual information, a region of interest and/or subject 609 situated within the one or more images included with the content at step 603.

In one or more embodiments, step 603 can comprise one or more processors of the electronic device detecting one or both of a geometric form factor of the electronic device and/or an orientation of the electronic device in three-dimensional space. Illustrating by example, the electronic device (101) of FIGS. 1, 4A, 4B, and 6 had a single device housing that does not bend and does not include hinges. Accordingly, the geometric form factor of the electronic device is fixed. However, the electronic device (200) of FIG. 2 had a first device housing that is pivotable about a hinge relative to a second device housing between a closed position and an axially displaced open position. Embodiments of the disclosure contemplate that the different geometric form factors can change the orientation of the content being presented. The method 600 of FIG. 6 therefore optionally determines the geometric form factor of the electronic device as well as the orientation of the electronic device in three-dimensional space.

At step 604, the one or more processors of the electronic device determine one or more content output parameters associated with the application operating on the one or more processors of the electronic device and generating the content for presentation on the electronic device. These content output parameters define how, absent any manipulation by the one or more processors of the electronic device, the content is rendered by the application. Knowledge of these content output parameters can be advantageous in that the one or more processors of the electronic device can modify them to match one or more content input parameters required by the content presentation companion device for rendering on its display when the one or more content output parameters of the application generating the content and the one or more content output parameters of the display of the content presentation companion device differ.

Figure 7:
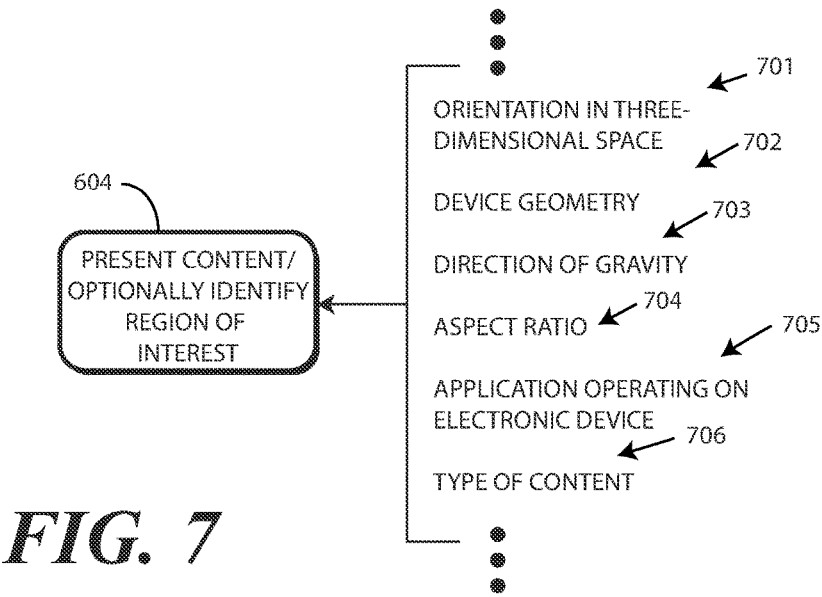
FIG. 7 illustrates one or more explanatory method steps in accordance with one or more embodiments of the disclosure.

Examples of these one or more content output parameters are shown in FIG. 7. Turning briefly to FIG. 7, in one or more embodiments the one or more content output parameters detected at step 604 can be determined by detecting an orientation 701 of the image capture device capturing images used in the content in three-dimensional space. Since the sensor of the image capture device is fixed within the housing of the electronic device, this can be done by proxy by detecting the orientation 701 of the electronic device in the three-dimensional space.

If, for example, the electronic device is in a landscape orientation and the image sensor of the image capture device is the same as that of the electronic device, the one or more images captured by the image capture device will be in a landscape image orientation. By contrast, when the electronic device is rotated from the landscape orientation to a portrait orientation, the one or more images captured in the image capture device of the electronic device will be in the portrait image orientation. Thus, image orientation is one example of a content output parameter that is determined by the orientation 701 of the image sensor of the image capture device in three-dimensional space, which may be the same or different from the orientation of the electronic device in three-dimensional space, but which will be fixed relative to the housing of the electronic device and can thus be detected via the orientation of the latter.

Detection of a direction of gravity 703 can also be detected at step 604 to determine the one or more content output parameters of the content. If, for example the direction of gravity 703 runs along a major axis spanning a length of the electronic device (or image sensor), the one or more images present in the content may be in the landscape image orientation. Thus, the one or more content output parameters determined at step 604 can also be determined using the direction of gravity 703.

Another example of a content output parameter defined by the physical structure of the image sensor of the image capture device is the aspect ratio 704, examples of which include a 4:3 aspect ratio and a 16:9 aspect ratio. The dimensions of the image sensor of the image capture device and the placement of sensor pixels thereon will determine the aspect ratio 704, which will remain fixed for the image sensor.

Embodiments of the disclosure contemplate that most content suitable for presentation on screens of electronic devices are formatted for one of two predefined aspect ratios: 4:3 and 16:9. While there are other aspect ratios in use, these two aspect ratios tend to be standards about which content providers configure content. The 4:3 aspect ratio is a legacy aspect ratio that dates itself to early cathode ray tubes associated with television sets. By contrast, the 16:9 ratio is sometimes referred to as a "widescreen" aspect ratio. Embodiments of the disclosure also contemplate that the 4:3 aspect ratio is well suited for use with tablet computers, as a tablet computer having a 4:3 aspect ratio has dimensions resembling a notepad or sheet of paper. By contrast, smartphones, gaming devices, and other handheld devices are well suited for the 16:9 aspect ratio, as this aspect ratio lends itself to an electronic device having dimensions that readily fit within a user's hand.

Another content output parameter can be the application 705 operating on the electronic device. In the examples described above, the image capture application generated content in only one orientation, namely, the landscape orientation. However, other applications may be able to generate content in both a portrait orientation and a landscape orientation depending upon the orientation 701 of the electronic device in three-dimensional space and/or its geometric form factor 702. Accordingly, the application 705 will frequently define in a predefined manner many, if not all, of the one or more content output parameters.

Other content output parameters can include the type of content 706 itself. While the content shown in FIGS. 4A, 4B, and 5 included an image portion (404) and a user interface portion (405), other content may not include any images captured by an image capture device of the electronic device. Gaming applications, for example, may generate content having images and graphics that do not include images captured by an image capture device of the electronic device. Where rearrangement of the content is required to meet the one or more content input parameters required by the content presentation companion device, the type of content 706 may determine in what ways the content can be rearranged, and so forth.

It should be noted that the various output content parameters shown in FIG. 3 as potentially being detected at step 604 are illustrative only. Numerous others will be obvious to those of ordinary skill in the art having the benefit of this disclosure. Moreover, these various output content parameters can be determined in any combination at step 604 as well.

Turning now back to FIG. 6, at step 605 one or more processors of the electronic device determine one or more content input parameters required by the content presentation companion device. In one or more embodiments, the one or more content input parameters required by the content presentation companion device will be defined by the requirements used to present the content such that the content fills the display of the content presentation companion device. Thus, if a content output parameter associated with the application is generating content with an aspect ratio of 4:3, a content input parameter required by the content presentation companion device for proper presentation of the content on the display of the content presentation companion device may be different, such as that of an aspect ratio of 16:9, and so forth.

In one or more embodiments, step 605 comprises receiving signals from the content presentation companion device using a communication device of the electronic device. In one or more embodiments, when the electronic device establishes a paired connection with the content presentation companion device, one or more processors of the electronic device cause a communication device to directly query one or more sensors of the content presentation companion device to determine its geometric orientation in three-dimensional space. Alternatively, processors of the content presentation companion device can optionally select one or more content input parameters and make a request by delivering electronic signals identifying the selected content input parameters to the communication device of the electronic device.

At step 606, the one or more processors of the electronic device alter the content to create altered content meeting the one or more content input parameters identified at step 605 and required for presentation on the display of the content presentation companion device. This alteration can occur in a variety of ways.

In one or more embodiments, the one or more content input parameters identified at step 605 and required for presentation on the display of the content presentation companion device that differ from the one or more content output parameters of the application generating the content comprise an aspect ratio 614 of the content. Accordingly, in one or more embodiments the altering occurring at step 606 comprises changing the aspect ratio 614 of the content to a different aspect ratio required for presentation on the display of the content presentation companion device.

In one or more embodiments, the one or more content input parameters identified at step 605 and required for presentation on the display of the content presentation companion device that differ from the one or more content output parameters of the application generating the content comprise an image orientation 615. Accordingly, in one or more embodiments the altering occurring at step 606 comprises changing the image orientation 615 of the content to a different image orientation required for presentation on the display of the content presentation companion device. This step 606 can comprise changing a portrait image orientation to a landscape image orientation, or vice versa.

In one or more embodiments, the one or more content input parameters identified at step 605 and required for presentation on the display of the content presentation companion device that differ from the one or more content output parameters of the application generating the content comprise an image size 616 of the content. Accordingly, in one or more embodiments the altering occurring at step 606 comprises changing the image size 616 of the one or more images captured at step 605 to a different image size required for presentation on the display of the content presentation companion device.

In one or more embodiments, this comprises cropping the content with a crop mask matching the content orientation of the content presentation companion device to create cropped content at step 606. In one or more embodiments, the crop mask is positioned such that a region of interest identified at step 603 is situated within the cropped content. Where the region of interest depicts a subject 608 of the region of interest, this results in the depictions of the subject 6089 being situated within the crop mask. Where the generative artificial intelligence engine 611 detects movement of the subject 608 and/or region of interest at step 603, step 606 can comprise moving the crop mask to maintain depictions of the subject substantially centered within the one or more cropped images presented in the content.

Figure 8:
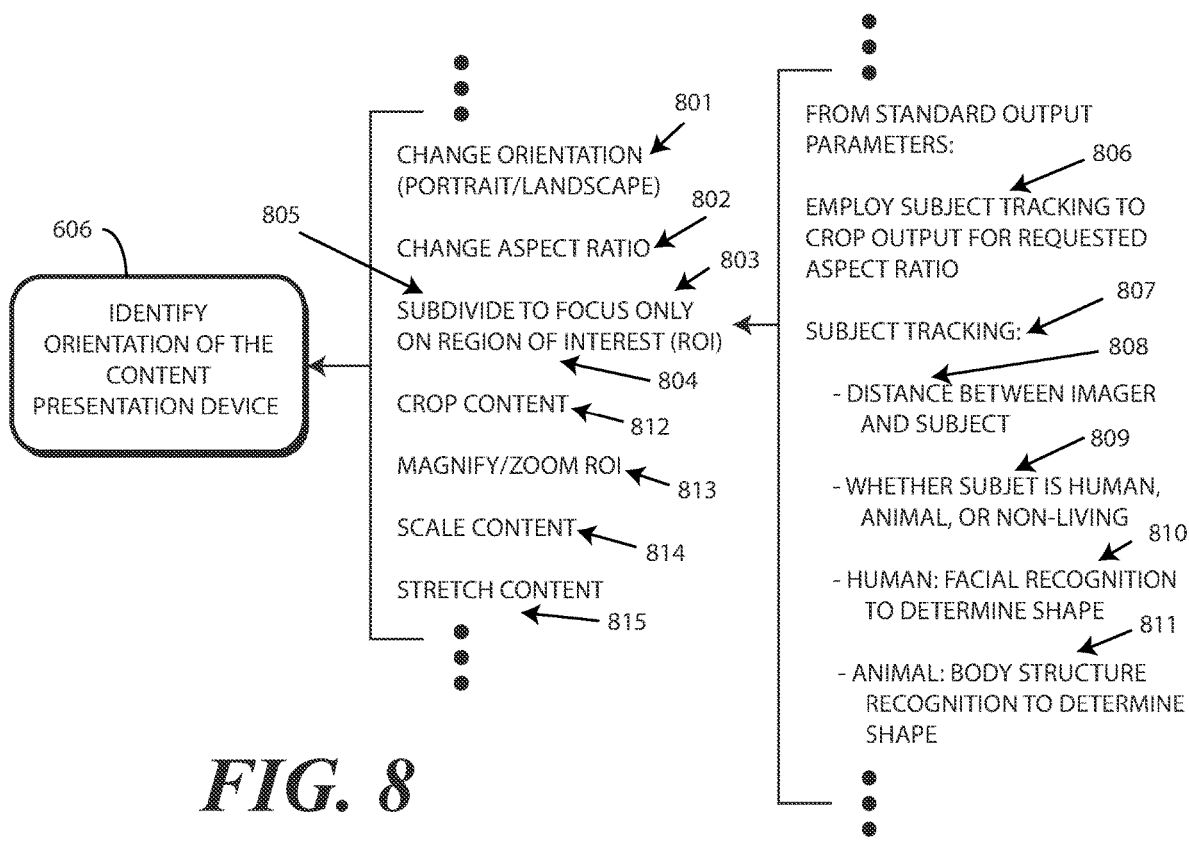
FIG. 8 illustrates one or more explanatory method steps in accordance with one or more embodiments of the disclosure.

Turning briefly to FIG. 8, illustrates there are several explanatory ways by which the alterations of step 606 can be made. These techniques for modifying images are illustrative only and can be performed in combination. Additionally, other techniques for modifying images at step 606 will be obvious to those of ordinary skill in the art having the benefit of this disclosure.

In one or more embodiments, the one or more processors of the electronic device modify the content to change any of the content output parameters that differ from any of the content input parameters to create altered content by changing an image orientation 801 of the content. Illustrating by example, the image orientation 801 may be transitioned from a portrait image orientation to a landscape image orientation, or vice versa.

Another way the one or more processors of the electronic device can modify the content to change any of the content output parameters that differ from any of the content input parameters to create altered content is by changing the aspect ratio 802 of the content. Illustrating by example, this may include transitioning the aspect ratio 802 of the content from a first aspect ratio of 4:3 to a second aspect ratio of 16:9, and so forth.

Still another way the one or more processors of the electronic device can modify the content to change any of the content output parameters that differ from any of the content input parameters to create altered content is by selecting a subset 803 of the content and/or one or more images presented within the content containing a region of interest 804. If, for example, a field of view of images presented in the content happens to be set to an ultra-wide setting, with the amount of content being wide enough to make a subject look small on the display of the content presentation companion device without modification, in one or more embodiments step 606 comprises identifying a region of interest 804 within the content and selecting a subset 805 of the content containing the region of interest 804 for presentation on the display of the content presentation companion device.

The way the selection of the region of interest 804 is made, like the modifications made at step 606, can vary. In one or more embodiments, the region of interest 804 is determined using artificial intelligence based subject tracking 806 that includes the one or more steps. In one or more embodiments, an aspect ratio of the content is determined. This aspect ratio might be 9:16 or 3:4, for example. In the illustrative embodiment of FIG. 2, the aspect ratio when mounted in a portrait orientation is 3:4.

Next, the artificial intelligence based subject tracking 806 utilizes a subject tracking procedure 807 to identify depictions of a subject in the content to determine centralized locations within the region of interest 804. In one or more embodiments, the artificial intelligence based subject tracking 806 determines the region of interest 804 within the content and selecting a subset 805 of the content such that the region of interest 804 is centrally situated within the subset 805.

Next, the artificial intelligence based subject tracking 806 determines the aspect ratio 802 of the content presentation companion device identified in the one or more content input parameters. If, for example, the content presentation companion device is oriented in a landscape mode, this might be 16:9 or 4:3. The artificial intelligence based subject tracking 806 then selects the subset 805 of the content with that subset 805 matching the aspect ratio 802 required by the content presentation companion device. Thus, despite the content being generated with an aspect ratio of 9:16 or 3:4, in one or more embodiments the artificial intelligence based subject tracking 806 alters the content to create altered content having a different aspect ratio, e.g., 16:9 or 4:3.

The artificial intelligence based subject tracking 806 can then track the subject based upon several factors. Accordingly, when the subject moves within images presented on the content, the selected subset 805 of the images can change as well. Said differently, the subset 805 selected will change as the region of interest 804 changes within the one or more images.

In one or more embodiments, these factors include the distance 808 between the image capture device and the subject. The artificial intelligence based subject tracking 806 can determine 809 if the subject is one of human, animal or a non-living being. If the artificial intelligence based subject tracking 806 determines that the subject is a human, it may utilize facial geometry 810 of the subject as one of round vs elongated to determine whether the subject is oriented in a portrait image orientation or a landscape image orientation. If the subject is an animal, the artificial intelligence based subject tracking may use the body structure 811 of the animal, be it a dog, cat, or bird, in the same manner.

Once the region of interest 804 is determined, a crop mask 812 can be applied to the content around the region of interest 804 at step 606. Said differently, step 606 can comprise cropping the one or more images with a crop mask 812 matching the region of interest 804, the content presentation orientation of the content presentation companion device. In one or more embodiments, the crop mask 812 is positioned such that the region of interest 804 is positioned within the altered content resulting from the application of the crop mask 812.

Yet other ways the one or more processors of the electronic device can modify the content to change any of the content output parameters that differ from any of the content input parameters to create altered content at step 606 is by magnifying 813 scaling 814, and/or stretching 815 the content. It should be noted that magnifying 813, scaling 814, and/or stretching 815 are different from changing the aspect ratio 802. Scaling 814 does not result in a change of the aspect ratio 802.

Turning now back to FIG. 6, in one or more embodiments a docked operating condition or a substantially stationary condition or a perfectly stationary condition of the electronic device is a prerequisite for step 606 to occur. Accordingly, where optional step 601 is included, in one or more embodiments step 606 alters the content to create the altered content for presentation on the display of the content presentation companion device only when the electronic device is substantially stationary. In another embodiment, step 606 alters the content to create the altered content for presentation on the display of the content presentation companion device only when the electronic device is perfectly stationary. In another embodiment, step 608 alters the content to create the altered content for presentation on the display of the content presentation companion device only when the electronic device is coupled to a docking station and engaged in a videoconference. At step 607, one or more processors of the electronic device cause a communication device of the electronic device to deliver the altered content to the content presentation companion device for presentation on the display of the content presentation companion device.

Figure 9:
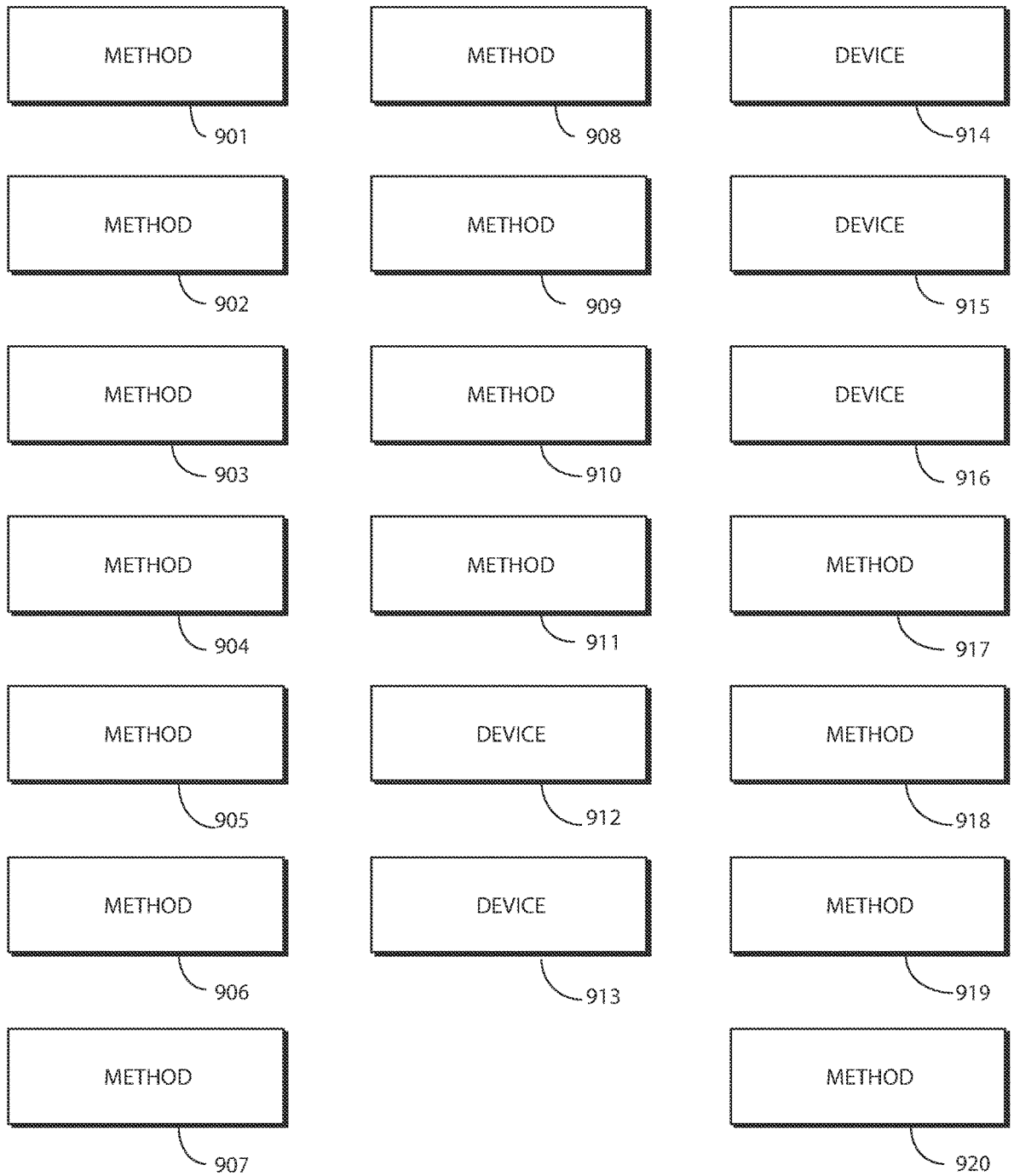
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, a method in an electronic device comprises detecting, with one or more processors, a communication device electronically in communication with a content presentation companion device operating as a primary display for the electronic device. At 901, the method comprises determining, by the one or more processors from signals received from the content presentation companion device by the communication device, one or more content input parameters required for content presentation on the content presentation companion.

At 901, the method comprises altering, by the one or more processors, content being presented on a display of the electronic device to create altered content. In one or more embodiments, the altered content meets the one or more content input parameters required for the presentation on the content presentation companion device.

At 902, the one or more content input parameters of 901 require a landscape orientation for the content presentation on the content presentation companion device. At 903, the altering of 902 occurs while the content being presented on the display of the electronic device is being presented in a portrait orientation.

At 904, the one or more content input parameters of 901 require a portrait orientation for the content presentation on the content presentation companion device. At 905, the altering of 904 occurs while the content being presented on the display of the electronic device is being presented in a landscape orientation.

At 906, the content of 901 being presented on the display of the electronic device is arranged in accordance with a first arrangement. At 906, the altered content is arranged with a second arrangement. At 906, the first arrangement and the second arrangement are different. At 907, the content of 906 being presented on the display of the electronic device and the altered content contain the same information.

At 908, the method of 901 further comprises determining, by the one or more processors using one or more sensors, whether the electronic device is moving. At 908, the altering occurs only when the electronic device is substantially stationary.

At 909, the method of 901 further comprises detecting the electronic device being coupled to a docking station. At 909, the altering occurs only when the electronic device is coupled to the docking station.

At 910, the content of 901 being presented on the display of the electronic device is generated by an application operating on the one or more processors of the electronic device in accordance with one or more predefined content output parameters. At 910, at least one predefined content output parameter of the one or more predefined content output parameters and at least one content input parameter of the one or more content input parameters required for content presentation on the content presentation companion are different. At 911, the one or more content input parameters of 901 required for content presentation on the content presentation companion are defined at least in part by an orientation of the content presentation companion device in three-dimensional space.

At 912, an electronic device comprises a display presenting content. At 912, the electronic device comprises a communication device electronically in communication with a content presentation companion device operating as a primary display for the electronic device. At 912, the communication device receives signals indicating a geometric orientation of the content presentation companion device in three-dimensional space.

At 912, one or more processors alter the content being presented on the display to obtain altered content configured in accordance with one or more content input parameters required for content presentation on the content presentation companion. At 912, the one or more content input parameters are defined by the geometric orientation of the content presentation companion device in the three-dimensional space.

At 913, the electronic device of 912 is positioned in a landscape orientation in the three-dimensional space. At 913, the geometric orientation of the content presentation companion device in the three-dimensional space is a portrait orientation.

At 914, the one or more processors of 912 operate one or more applications generating the content being presented on the display of the electronic device in accordance with one or more content output presentation parameters. At 914, the one or more content output parameters are different from the one or more content input parameters required for content presentation on the content presentation companion and defined by the geometric orientation of the content presentation companion device in the three-dimensional space.

At 915, the content of 914 being presented on the display comprises a user interface. At 916, the content of 915 being presented on the display comprises one or more images.

At 916, the one or more processors alter the content being presented on the display to obtain altered content configured in accordance with the one or more content input parameters required for the content presentation on the content presentation companion defined by the geometric orientation of the content presentation companion device in the three-dimensional space by rearranging the one or more images relative to the user interface. At 917, the content of 915 being presented on the display comprises one or more images situated atop the user interface. At 917, the altered content comprises the one or more images situated beside the user interface.

At 918, a method in an electronic device comprises detecting, with one or more sensors, whether the electronic device is in a stationary condition or a docked condition. At 918, the method comprises detecting, with a communication device, a content presentation companion device in communication with the communication device being used as a primary display for the electronic device and a geometric orientation of the content presentation companion device in three-dimensional space.

At 918, the method comprises altering, with one or more processors, content being presented on a display of the electronic device as a function of the geometric orientation of the content presentation companion device in the three-dimensional space to obtain altered content. At 918, the method comprises delivering, with the communication device, the altered content to the content presentation companion device for presentation on the content presentation companion device.

At 919, the content of 918 being presented on the display of the electronic device and the altered content are arranged differently. At 920, the method of 918 further comprises identifying, with the one or more processors, a region of interest of the content being presented on the display, wherein the altering results in altered content containing the region of interest In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

detecting, with one or more processors, a communication device electronically in communication with a content presentation companion device operating as a primary display for the electronic device;

determining, by the one or more processors from signals received from the content presentation companion device by the communication device, one or more content input parameters required for content presentation on the content presentation companion device; and altering, by the one or more processors, content being presented on a display of the electronic device to create altered content meeting the one or more content input parameters required for the presentation on the content presentation companion device;

wherein the content being presented on the display of the electronic device is arranged in accordance with a first arrangement, the altered content is arranged with a second arrangement, wherein:

the first arrangement and the second arrangement are different; and the content and the altered content include at least one difference other than rotation.

2. The method of claim 1, wherein the one or more content input parameters require a landscape orientation for the presentation on the content presentation companion device.

3. The method of claim 2, wherein the altering occurs while the content being presented on the display of the electronic device is being presented in a portrait orientation.

4. The method of claim 1, wherein the one or more content input parameters require a portrait orientation for the presentation on the content presentation companion device.

5. The method of claim 4, wherein the altering occurs while the content being presented on the display of the electronic device is being presented in a landscape orientation.

6. The method of claim 1, wherein the first arrangement comprises an image portion and a user interface arranged in a side-by-side relationship the second arrangement comprises the image portion and the user interface arranged in a over-and-under relationship without rotation of the image portion.

7. The method of claim 6, wherein the first arrangement comprises user actuation targets of the user interface arranged in an N×M matrix and the second arrangement comprises the user actuation targets of the user interface arranged in an M×N matrix.

8. The method of claim 1, further comprising determining, by the one or more processors using one or more sensors, whether the electronic device is moving, wherein the altering occurs only when the electronic device is substantially stationary.

9. The method of claim 1, further comprising detecting the electronic device being coupled to a docking station, wherein the altering occurs only when the electronic device is coupled to the docking station.

10. The method of claim 1, wherein the content being presented on the display of the electronic device is generated by an application operating on the one or more processors of the electronic device in accordance with one or more predefined content output parameters, wherein at least one predefined content output parameter of the one or more predefined content output parameters and at least one content input parameter of the one or more content input parameters required for content presentation on the content presentation companion device are different.

11. The method of claim 1, wherein the one or more content input parameters required for content presentation on the content presentation companion device are defined at least in part by an orientation of the content presentation companion device in three-dimensional space.

12. An electronic device, comprising:

a display presenting content;

a communication device electronically in communication with a content presentation companion device operating as a primary display for the electronic device and receiving signals indicating a geometric orientation of the content presentation companion device in three-dimensional space; and one or more processors altering the content being presented on the display to obtain altered content configured in accordance with one or more content input parameters required for content presentation on the content presentation companion device defined by the geometric orientation of the content presentation companion device in the three-dimensional space;

wherein:

the content being presented on the display comprises a user interface; and the content being presented on the display comprises one or more images;

the one or more processors altering the content being presented on the display to obtain altered content configured in accordance with the one or more content input parameters required for the presentation on the content presentation companion device defined by the geometric orientation of the content presentation companion device in the three-dimensional space by rearranging the one or more images relative to the user interface without rotation of the one or more images.

13. The electronic device of claim 12, wherein the electronic device is positioned in a landscape orientation in the three-dimensional space and the geometric orientation of the content presentation companion device in the three-dimensional space is a portrait orientation.

14. The electronic device of claim 12, the one or more processors operating one or more applications generating the content being presented on the display of the electronic device in accordance with one or more content output presentation parameters that are different from the one or more content input parameters required for content presentation on the content presentation companion device and defined by the geometric orientation of the content presentation companion device in the three-dimensional space.

15. The electronic device of claim 14, wherein the content has an aspect ratio that is one of 4:3 or 16:9 and the altered content has an aspect ratio that is another of 4:3 or 16:9.

16. The electronic device of claim 14, wherein the one or more processors altering the content being presented on the display to obtain altered content configured in accordance with the one or more content input parameters required for the presentation on the content presentation companion device defined by the geometric orientation of the content presentation companion device in the three-dimensional space by rearranging one or more user actuation targets within the user interface without rotation of any of the one or more user actuation targets.

17. The electronic device of claim 15, wherein the content being presented on the display comprises one or more images situated atop the user interface and the altered content comprises the one or more images situated beside the user interface.

18. A method in an electronic device, the method comprising:

detecting, with one or more sensors, whether the electronic device is in a stationary condition or a docked condition;

detecting, with a communication device, a content presentation companion device in communication with the communication device being used as a primary display for the electronic device and a geometric orientation of the content presentation companion device in three-dimensional space;

altering, with one or more processors, content being presented on a display of the electronic device as a function of the geometric orientation of the content presentation companion device in the three-dimensional space by selecting a subset of the content containing an identified region of interest for presentation on the content presentation companion device as altered content; and delivering, with the communication device, the altered content to the content presentation companion device for presentation on the content presentation companion device.

19. The method of claim 18, wherein the subset is selected such that the subset has an aspect ratio matching the content presentation companion device, wherein the aspect ratio is different from another aspect ratio of the content.

20. The method of claim 18, wherein the region of interest is identified by subject tracking such that a subject is centrally situated within the subset of the content, further comprising selecting a different subset of the content for presentation on the content presentation companion device as the altered content when the subject moves within the content.

\* \* \* \* \*